(12) United States Patent
Okajima et al.

(10) Patent No.: US 12,202,980 B2
(45) Date of Patent: Jan. 21, 2025

(54) INTERMEDIATE FILM FOR LAMINATED GLASS, AND LAMINATED GLASS

(71) Applicant: SEKISUI CHEMICAL CO., LTD., Osaka (JP)

(72) Inventors: Moyuru Okajima, Shiga (JP); Reiko Kishida, Shiga (JP); Ryuta Tsunoda, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 180 days.

(21) Appl. No.: 17/779,292

(22) PCT Filed: Dec. 7, 2020

(86) PCT No.: PCT/JP2020/045435
§ 371 (c)(1),
(2) Date: May 24, 2022

(87) PCT Pub. No.: WO2021/124948
PCT Pub. Date: Jun. 24, 2021

(65) Prior Publication Data
US 2022/0403175 A1    Dec. 22, 2022

(30) Foreign Application Priority Data
Dec. 19, 2019    (JP) .................................. 2019-229105

(51) Int. Cl.
| | | |
|---|---|---|
| *B32B 17/10* | (2006.01) | |
| *B32B 27/20* | (2006.01) | |
| *B32B 27/22* | (2006.01) | |
| *C08J 5/18* | (2006.01) | |
| *C09B 67/20* | (2006.01) | |

(Continued)

(52) U.S. Cl.
CPC .... *C09B 67/0033* (2013.01); *B32B 17/10036* (2013.01); *B32B 17/10651* (2013.01); *B32B 27/20* (2013.01); *B32B 27/22* (2013.01); *C08J 5/18* (2013.01); *C09B 67/0063* (2013.01); *B32B 17/10761* (2013.01); *B32B 27/08* (2013.01); *B32B 27/306* (2013.01); *B32B 2250/40* (2013.01); *B32B 2307/4026* (2013.01)

(58) Field of Classification Search
None
See application file for complete search history.

(56) References Cited

U.S. PATENT DOCUMENTS

| | | |
|---|---|---|
| 2004/0160688 A1 | 8/2004 | Noguchi et al. |
| 2006/0250711 A1 | 11/2006 | Noguchi et al. |

(Continued)

FOREIGN PATENT DOCUMENTS

| | | |
|---|---|---|
| CN | 102471153 | 5/2012 |
| JP | 63-230540 | 9/1988 |

(Continued)

OTHER PUBLICATIONS

"Solvent Red 135" from www.worlddyevariety.com (Year: 2018).*

(Continued)

*Primary Examiner* — David Sample
(74) *Attorney, Agent, or Firm* — Wenderoth, Lind & Ponack, L.L.P.

(57) ABSTRACT

Provided is an interlayer film for laminated glass capable of enhancing the weatherability. The interlayer film for laminated glass according to the present invention contains an anthraquinone dye and a perinone dye.

8 Claims, 2 Drawing Sheets

(51) Int. Cl.
*C09B 67/22* (2006.01)
*B32B 27/08* (2006.01)
*B32B 27/30* (2006.01)

(56) References Cited

U.S. PATENT DOCUMENTS

| | | |
|---|---|---|
| 2007/0231584 A1 | 10/2007 | Hasegawa |
| 2009/0033844 A1 | 2/2009 | Ando et al. |
| 2011/0287265 A1 | 11/2011 | Hasegawa |
| 2012/0164409 A1 | 6/2012 | Masaki |
| 2019/0218353 A1 | 7/2019 | Ozawa et al. |
| 2020/0009837 A1 * | 1/2020 | Yoshida .............. B32B 17/1011 |

FOREIGN PATENT DOCUMENTS

| | | |
|---|---|---|
| JP | 2-99323 | 4/1990 |
| JP | 2003-175577 | 6/2003 |
| JP | 2004-149551 | 5/2004 |
| WO | 03/059837 | 7/2003 |
| WO | 2006/082800 | 8/2006 |
| WO | 2007/086217 | 8/2007 |
| WO | WO-2018182029 A1 * | 10/2018 ............. B32B 17/04 |

OTHER PUBLICATIONS

Van Nostrand's Scientific Encyclopedia, vol. 2, p. 4114 (Year: 2008).*

International Search Report (ISR) issued Jan. 26, 2021 in International (PCT) Application No. PCT/JP2020/045435.

International Preliminary Report on Patentability and Written Opinion of the International Searching Authority issued May 17, 2022 in International (PCT) Application No. PCT/JP2020/045435.

Extended European Search Report issued Dec. 14, 2023 in corresponding European Patent Application No. 20900780.6.

* cited by examiner

[FIG. 1.]
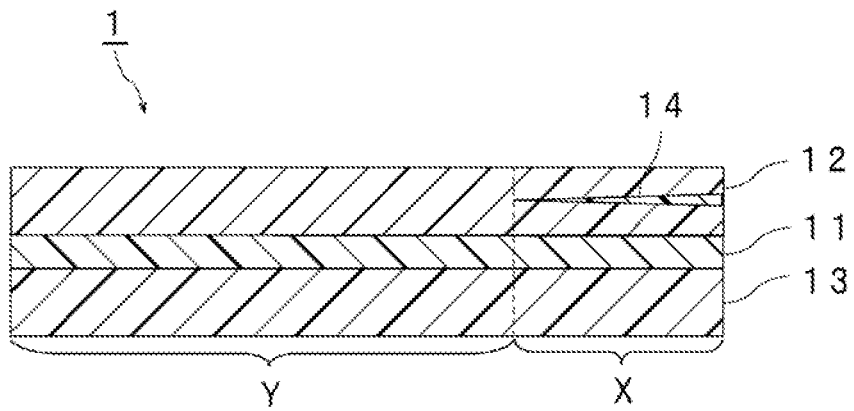
[FIG. 2.]
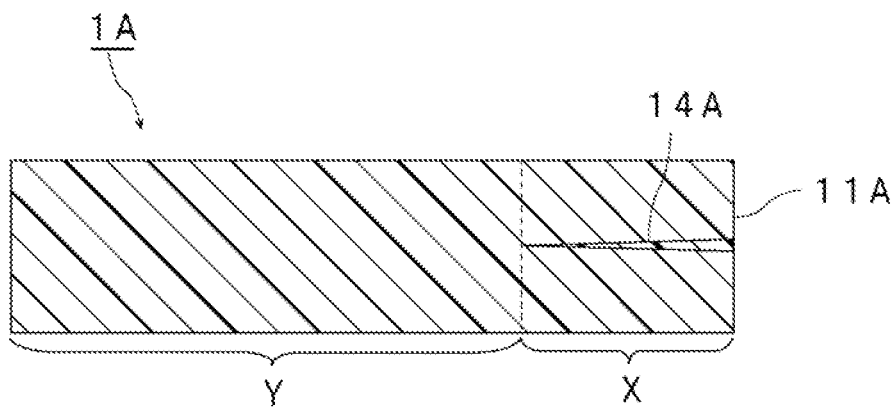
[FIG. 3.]
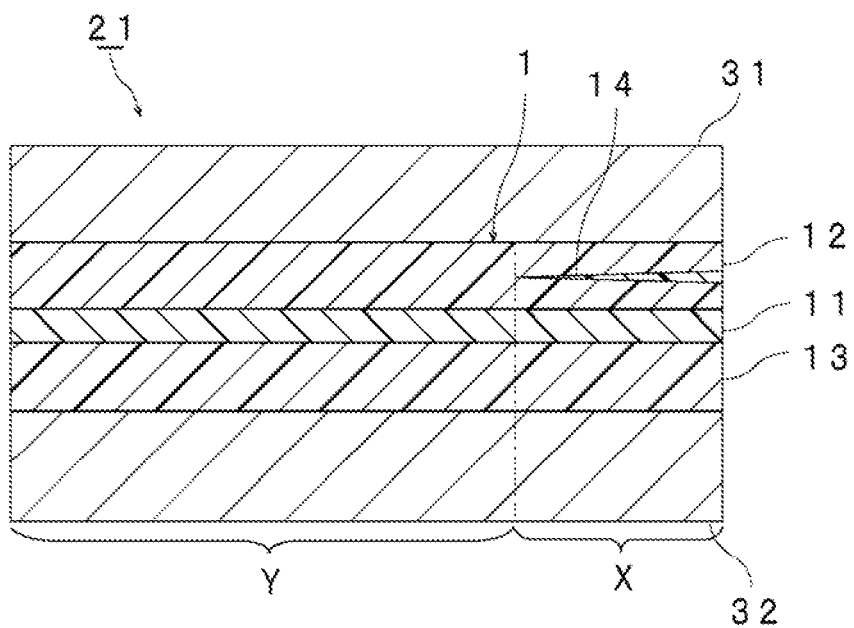

[FIG. 4.]
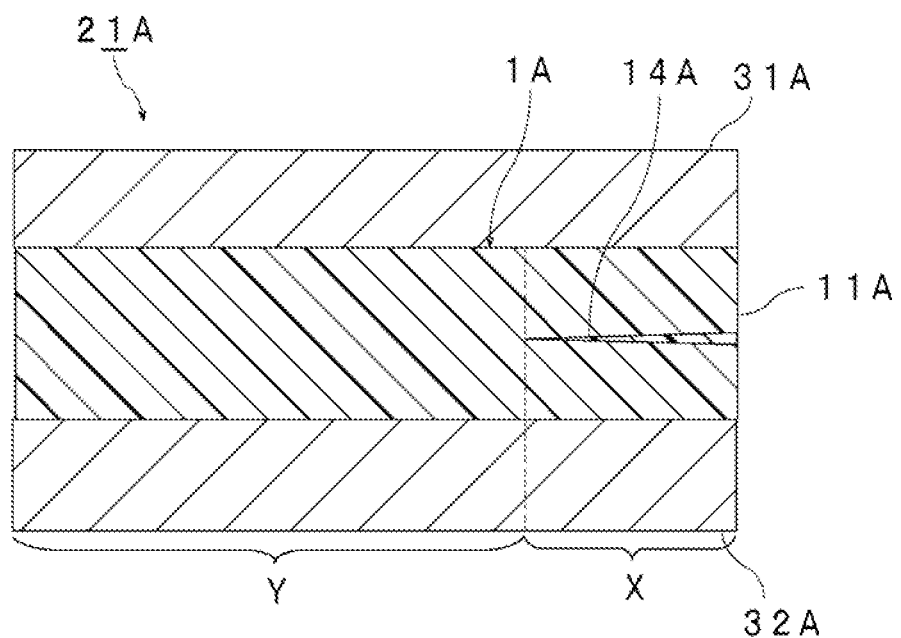

INTERMEDIATE FILM FOR LAMINATED GLASS, AND LAMINATED GLASS

TECHNICAL FIELD

The present invention relates to an interlayer film for laminated glass which is used for obtaining laminated glass. Moreover, the present invention relates to a laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film between a pair of glass plates.

In recent years, laminated glass having designability, light shielding property, or privacy protectability and the like is demanded as laminated glass for buildings or automobiles. Laminated glass having designability, light shielding property, or privacy protectability and the like can be obtained by using an interlayer film containing a coloring agent such as a dye and a pigment and the like.

As one example of laminated glass having privacy protectability, the following Patent Document 1 discloses a laminated glass prepared with a multilayer interlayer film having an opaque layer. In the laminated glass, privacy protectability is achieved by the opaque layer that makes a person or an object located behind the laminated glass invisible. The opaque layer may contain, for example, inorganic powder, and may contain a dye or a pigment.

Patent Document 2 discloses a laminated glass for vehicle in which two glass plates are adhered to each other with an interlayer film interposed therebetween. The interlayer film includes a first region imparted with a light dimming function that causes loss of transmittance for visible light, and a second region surrounded by the first region, or a second region formed by partially recessing an end part of the first region. In the second region, the interlayer film has a loss of transmittance that is smaller than the aforementioned loss of transmittance for visible light. The first region may contain, for example, a pigment or a dye. The first region may be a belt-shaped shading region.

RELATED ART DOCUMENT

Patent Document

Patent Document 1: WO2006/082800 A1
Patent Document 2: WO2003/059837 A1

SUMMARY OF THE INVENTION

Problems to be Solved by the Invention

A laminated glass prepared with an interlayer film containing a dye or a pigment as a coloring agent is sometimes poor in weatherability. Therefore, when the laminated glass prepared with an interlayer film containing a dye or a pigment is exposed to sunlight or the like for a long period, the color shade in the colored part sometimes changes.

It is an object of the present invention to provide an interlayer film for laminated glass capable of enhancing the weatherability. It is also an object of the present invention to provide a laminated glass prepared with the interlayer film for laminated glass.

Means for Solving the Problems

According to a broad aspect of the present invention, there is provided an interlayer film for laminated glass (in the present specification, "interlayer film for laminated glass" is sometimes abbreviated as "interlayer film") containing an anthraquinone dye and a perinone dye.

In a specific aspect of the interlayer film according to the present invention, the interlayer film contains a light stabilizer.

In a specific aspect of the interlayer film according to the present invention, the light stabilizer is a light stabilizer in which a carbon atom is bonded to a nitrogen atom of a piperidine structure.

In a specific aspect of the interlayer film according to the present invention, the interlayer film contains a thermoplastic resin.

In a specific aspect of the interlayer film according to the present invention, the interlayer film contains a plasticizer.

In a specific aspect of the interlayer film according to the present invention, the anthraquinone dye is a blue coloring matter.

In a specific aspect of the interlayer film according to the present invention, the perinone dye is a red coloring matter.

In a specific aspect of the interlayer film according to the present invention, the interlayer film contains a yellow coloring matter as a coloring agent that is different from both of the anthraquinone dye and the perinone dye.

In a specific aspect of the interlayer film according to the present invention, the yellow coloring matter is an azo pigment or a quinoline dye.

In a specific aspect of the interlayer film according to the present invention, the interlayer film contains an azo pigment or a quinoline dye.

According to a broad aspect of the present invention, there is provided a laminated glass including a first lamination glass member, a second lamination glass member, and the above-described interlayer film for laminated glass, the interlayer film for laminated glass being arranged between the first lamination glass member and the second lamination glass member.

Effect of the Invention

The interlayer film for laminated glass according to the present invention is capable of enhancing the weatherability since it contains an anthraquinone dye and a perinone dye.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

MODES FOR CARRYING OUT THE INVENTION

Hereinafter, the details of the present invention will be described.

(Interlayer Film for Laminated Glass)

The interlayer film for laminated glass according to the present invention (hereinafter, sometimes abbreviated as "interlayer film") contains an anthraquinone dye and a perinone dye.

In the interlayer film according to the present invention, since the above-described configuration is provided, it is possible to enhance the weatherability.

For obtaining a laminated glass having designability, light shielding property, or privacy protectability and the like, a coloring agent such as a dye and a pigment and the like is used. However, a laminated glass prepared with an interlayer film containing a dye or a pigment as a coloring agent is sometimes poor in weatherability. Therefore, when the laminated glass prepared with an interlayer film containing a dye or a pigment is exposed to sunlight or the like for a long period, the color shade in the colored part sometimes changes. For preventing degradation of the resin, the interlayer film sometimes contain a light stabilizer. However, in a laminated glass prepared with an interlayer film containing a dye or a pigment, and a light stabilizer, the weatherability is prone to deteriorate, and the color shade in the colored part is more prone to change. Furthermore, in a laminated glass prepared with an interlayer film containing a dye or pigment that is a blue coloring matter, and a light stabilizer, the weatherability is still more prone to deteriorate, and the color shade in the colored part is still more prone to change. By using only a pigment as the coloring agent, the weatherability of the laminated glass can be enhanced to some extent, but the haze tends to increase as compared with the case where only a dye is used. Therefore, it is unfavorable to use only a pigment as the coloring agent.

The present inventors found a configuration capable of enhancing the weatherability in an interlayer film containing a dye. That is, the present inventors found that the weatherability can be significantly enhanced by combining at least two kinds of compounds having specific structures as a coloring agent, and using a dye as the at least two kinds of compounds having specific structures. In the interlayer film according to the present invention, since a combination of an anthraquinone dye and a perinone dye is used, the weatherability can be enhanced, and discoloration in the colored part can be significantly suppressed even when the laminated glass is exposed to the sunlight for a long period. Furthermore, in the interlayer film according to the present invention, it is possible to effectively suppress discoloration in the colored part even when a light stabilizer is contained.

Also, in the interlayer film according to the present invention, it is possible to suppress the haze of the laminated glass to a low level. Furthermore, in the interlayer film according to the present invention, it is possible to effectively suppress foaming in an end part of the laminated glass.

The interlayer film has a one-layer structure or a two or more-layer structure. The interlayer film may have a one-layer structure and may have a two or more-layer structure. The interlayer film may have a two-layer structure, may have a three-layer structure, may have a three or more-layer structure, may have a four or more-layer structure, may have a five or more-layer structure, and may have a six or more-layer structure. The interlayer may be an interlayer film having a one-layer structure including only a first layer (single-layered interlayer film) and may be an interlayer film having a two or more-layer structure including a first layer and another layer (multi-layered interlayer film). The interlayer film may have these structures in part of the interlayer film or in the entire interlayer film. The structure of the interlayer film may partially vary.

The interlayer film may have a colored part that is colored in plan view, and a non-colored part that is not colored in plan view. The interlayer film may have a colored part that is colored in plan view in one end side of the widthwise direction, and may have a non-colored part that is not colored in plan view in the other end side opposite to the one end of the widthwise direction. In the colored part, there may be a colored portion and a non-colored portion in the thickness direction of the interlayer film. In this case, the part that is colored in plan view is a colored part including the colored portion and the uncolored portion (for example, the right side part of the broken line in FIGS. 1, 2).

The interlayer film may have only a colored part that is colored in plan view. The interlayer film need not have a non-colored part that is not colored in plan view.

It is preferred that the interlayer film include a plurality of layers in one end side of the widthwise direction. It is preferred that the interlayer film include a plurality of layers in the colored part. In this case, the interlayer film may include a colored layer containing a coloring agent, and a layer other than the colored layer in the colored part.

FIG. 1 is a sectional view schematically showing an interlayer film for laminated glass in accordance with a first embodiment of the present invention.

An interlayer film 1 shown in FIG. 1 is used for obtaining laminated glass. The interlayer film 1 is an interlayer film for laminated glass.

The interlayer film 1 includes a first layer 11, a second layer 12 and a third layer 13. The second layer 12 is arranged on a first surface side (one surface) of the first layer 11. The second layer 12 is layered on the first surface of the first layer 11. The first layer 11 and the second layer 12 are in contact with each other. The third layer 13 is arranged on a second surface side opposite to the first surface of the first layer 11. The third layer 13 is layered on the second surface of the first layer 11. The first layer 11 and the third layer 13 are in contact with each other. The first layer 11 is arranged between the second layer 12 and the third layer 13 to be sandwiched therebetween.

In this connection, other layers may be arranged between the first layer 11 and the second layer 12 and between the first layer 11 and the third layer 13, respectively. It is preferred that the first layer 11 and the second layer 12, and the first layer 11 and the third layer 13 be directly layered, respectively.

The interlayer film 1 has a lengthwise direction and a widthwise direction. The right and left direction of FIG. 1 is the widthwise direction.

The interlayer film 1 includes a colored layer 14 containing a coloring agent. The coloring agent contains an anthraquinone dye and a perinone dye. Therefore, the colored layer 14 contains an anthraquinone dye and a perinone dye. The colored layer 14 is embedded in the second layer 12. In one end side of the interlayer film 1, the colored layer 14 is embedded in the second layer 12. In one end side of the widthwise direction of the interlayer film 1, the colored layer 14 is embedded in the second layer 12.

The interlayer film may include only one colored layer, and may include a plurality of colored layers. The colored layer may be embedded in the first layer, may be arranged between the first layer and the second layer, may be arranged on a side opposite to the first layer side of the second layer, may be embedded in the third layer, may be arranged between the first layer and the third layer, and may be arranged on a side opposite to the first layer side of the third layer.

The interlayer film 1 has a colored part X that is colored in plan view, in the part including the colored layer 14. The interlayer film 1 has a non-colored part Y that is not colored in plan view, in the part not including the colored layer 14. The entire part on the right side of the broken line in FIG. 1 is called the colored part X. The entire part on the left side of the broken line in FIG. 1 is called the non-colored part Y.

The interlayer film 1 has a multilayer structure in which the second layer 12, the colored layer 14, the second layer 12, the first layer 11, and the third layer 13 are arranged in this order in the colored part X. The interlayer film 1 has a five-layer structure in the colored part X.

The interlayer film 1 has a multilayer structure in which the second layer 12, the first layer 11, and the third layer 13 are arranged in this order in the non-colored part Y. The interlayer film 1 has a three-layer structure in the non-colored part Y.

It is preferred that an outer surface on the opposite side of the first layer 11 side of the second layer 12 be a surface on which a lamination glass member is laminated. It is preferred that an outer surface on the opposite side of the first layer 11 side of the third layer 13 be a surface on which a lamination glass member is laminated.

FIG. 2 is a sectional view schematically showing an interlayer film for laminated glass in accordance with a second embodiment of the present invention.

An interlayer film 1A shown in FIG. 2 includes a first layer 11A.

The interlayer film 1A has a lengthwise direction and a widthwise direction. The right and left direction of FIG. 2 is the widthwise direction.

The interlayer film 1A includes a colored layer 14A containing a coloring agent. The colored layer 14A is embedded in the first layer 11A. The coloring agent contains an anthraquinone dye and a perinone dye. Therefore, the colored layer 14A contains an anthraquinone dye and a perinone dye. In one end side of the interlayer film 1A, the colored layer 14A is embedded in the first layer 11A. In one end side in the widthwise direction of the interlayer film 1A, the colored layer 14A is embedded in the first layer 11A.

The interlayer film 1A has the colored part X that is colored in plan view, in the part including the colored layer 14A. The interlayer film 1A has the non-colored part Y that is not colored in plan view, in the part not including the colored layer 14A.

The interlayer film 1A has a multilayer structure including the first layer 11A, the colored layer 14A and the first layer 11A in the colored part X. The interlayer film 1A has a three-layer structure in the colored part X.

The interlayer film 1A has a monolayer structure of only the first layer 11A in the non-colored part Y. The interlayer film 1A has a one-layer structure in the non-colored part Y.

Hereinafter, materials that can be used in the interlayer film according to the present invention are specifically described.

(Coloring Agent)

The interlayer film contains a dye as a coloring agent, and contains an anthraquinone dye and a perinone dye as the dye. The interlayer film according to the present invention may contain a dye that is different from both of the anthraquinone dye and the perinone dye, and may contain a pigment as a coloring agent.

Which of dyes and pigments the coloring agent is categorized in can be discriminated according to the classification by the color index.

In the present specification, for coloring agents and the like that are not described in the color index, "pigment" and "dye" may be defined as follows. A polyvinyl butyral resin (the polymerization degree of polyvinyl alcohol of 1700, the content of the hydroxyl group of 30% by mole, the acetylation degree of 1% by mole, the butyralization degree of 69% by mole) is prepared. One hundred parts by weight of the polyvinyl butyral resin, 40 parts by weight of triethylene glycol di-2-ethylhexanoate (3GO), and a coloring agent in an content of 0.015% by weight, relative to 100% by weight of the total amount of the polyvinyl butyral resin and 3GO are kneaded and extruded to give a resin film (single layer) having a thickness of 760 μm. When laminated glass is prepared with the resin film, and two sheets of clear glass (2.5 mm thick) having a visible light transmittance of 90% as measured in accordance with JIS R3106:1998, the coloring agent which the obtained laminated glass has a haze value of 0.35% or more is determined as a pigment. The coloring agent having a haze value of less than 0.35% is determined as a dye.

In the present specification, the color tone of the coloring matter means a color tone classified according to the color index.

<Anthraquinone Dye>

The interlayer film contains an anthraquinone dye. The colored layer contains an anthraquinone dye. One kind of the anthraquinone dye may be used alone, and two or more kinds thereof may be used in combination.

In the present specification, the anthraquinone dye is a dye having a structure represented by the following formula (X).

[Chemical 1]

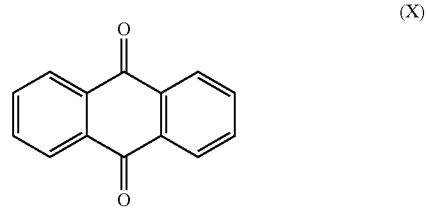

(X)

From the viewpoint of exerting the effect of the present invention more effectively, it is preferred that the anthraquinone dye be a compound represented by the following formula (X1).

[Chemical 2]

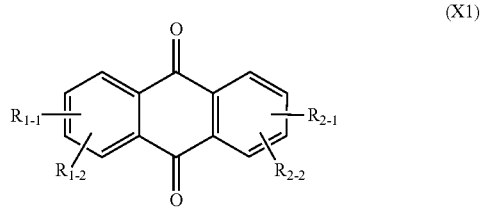

(X1)

In the formula (X1), $R_{1\text{-}1}$, $R_{1\text{-}2}$, $R_{2\text{-}1}$ and $R_{2\text{-}2}$ each independently represent a hydrogen atom, an alkyl group, an aryl group, a heteroaryl group, an amino group, a hydroxyl group, an alkoxy group, a halogen atom, a sulfonyl group or a thiol group.

From the viewpoint of exerting the effect of the present invention more effectively, it is preferred that in the formula (X1), $R_{1-1}$ and $R_{1-2}$ each represent a hydrogen atom, and $R_{2-1}$ and $R_{2-2}$ each represent a hydrogen atom or an amino group.

From the viewpoint of exerting the effect of the present invention more effectively, it is more preferred that the anthraquinone dye represented by the formula (X1) be a compound represented by the following formula (X2).

[Chemical 3]

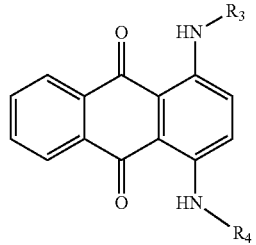

(X2)

In the formula (X2), $R_3$ and $R_4$ each independently represent an alkyl group or an aryl group.

From the viewpoint of exerting the effect of the present invention more effectively, it is preferred that in the formula (X2), $R_3$ and $R_4$ represent an aryl group.

From the viewpoint of exerting the effect of the present invention still more effectively, it is more preferred that the anthraquinone dye represented by the formula (X2) be a compound represented by the following formula (X3).

[Chemical 4]

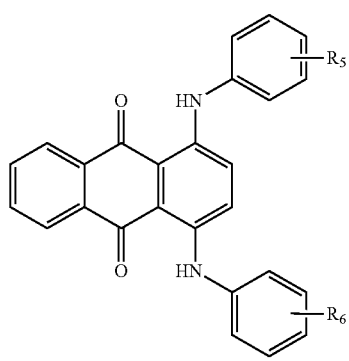

(X3)

In the formula (X3), $R_5$ and $R_6$ each independently represent a hydrogen atom, an alkyl group or a sulfonyl group.

From the viewpoint of exerting the effect of the present invention especially more effectively, it is preferred that the anthraquinone dye represented by the formula (X3) be a compound represented by the compound (X4) of the following formula.

[Chemical 5]

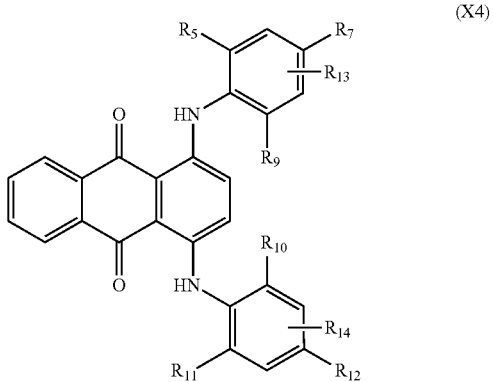

(X4)

In the formula (X4), $R_7$, $R_8$, $R_9$, $R_{10}$, $R_{11}$ and $R_{12}$ each independently represent an alkyl group, and $R_{13}$ and $R_{14}$ each independently represent a hydrogen atom or a sulfonyl group.

From the viewpoint of exerting the effect of the present invention especially more effectively, in the formula (X4), $R_7$, $R_8$, $R_9$, $R_{10}$, $R_{11}$ and $R_{12}$ preferably represent an alkyl group, and more preferably represent a methyl group, an ethyl group or a propyl group. In the formula (X4), it is preferred that $R_{13}$ and $R_{14}$ represent a hydrogen atom or a sulfonyl group. It is preferred that the sulfonyl group be a sulfonamide group. Therefore, in the formula (X4), it is preferred that $R_{13}$ and $R_{14}$ represent a hydrogen atom or a sulfonamide group.

Examples of the anthraquinone dye represented by the formula (X4) include Solvent Blue 45 (CAS37229-23-5), Solvent Blue 97 (CAS61969-44-6, 32724-62-2), and Solvent Blue 104 (CAS116-75-6), and the like.

Examples of the anthraquinone dye include a blue coloring matter, a yellow coloring matter, a red coloring matter, a violet coloring matter, and the like. Examples of the color tone of the anthraquinone dye include blue, yellow, red, violet and the like.

Examples of the anthraquinone dye that is a blue coloring matter include Solvent Blue 45 (CAS37229-23-5), Solvent Blue 97 (CAS61969-44-6), Solvent Blue 104 (CAS116-75-6), and Disperse Blue 214 (CAS104491-84-1), and the like.

Examples of the anthraquinone dye that is a yellow coloring matter include Solvent Yellow 163 (CAS13676-91-0) and the like.

Examples of the anthraquinone dye that is a red coloring matter include Disperse Red 92 (CAS12236-11-2), Solvent Red 111 (CAS82-38-2), Solvent Red 207 (CAS15958-69-6), Disperse Red 22 (CAS2944-28-7), and Disperse Red 191 (CAS103657-51-8) and the like.

Examples of the anthraquinone dye that is a violet coloring matter include Solvent Violet 13 (CAS81-48-1), Disperse Violet 28 (CAS81-24-5), and Disperse Violet 31 (CAS6408-72-6) and the like.

From the viewpoint of satisfactorily dying the colored layer and the colored part to have a bluish color tone and from the viewpoint of exerting the effect of the present invention more effectively, it is preferred that the anthraquinone dye contain a blue coloring matter, and it is more preferred that the anthraquinone dye be a blue coloring matter. It is preferred that the colored layer, the colored part or the interlayer film contain an anthraquinone dye that is a blue coloring matter.

In 100% by weight of the colored layer, the content of the anthraquinone dye is preferably 0.380% by weight or more, more preferably 0.530% by weight or more, further preferably 0.670% by weight or more, and is preferably 2.700% by weight or less, more preferably 2.500% by weight or less, further preferably 1.600% by weight or less. When the content of the anthraquinone dye is the above lower limit or more and the above upper limit or less, it is possible to exert the effect of the present invention more effectively.

In 100% by weight of the colored layer, the content of the anthraquinone dye that is a blue coloring matter is preferably 0.300% by weight or more, more preferably 0.450% by weight or more, further preferably 0.500% by weight or more, and is preferably 2.500% by weight or less, more preferably 2.000% by weight or less, further preferably 1.500% by weight or less. When the content of the anthraquinone dye that is a blue coloring matter is the above lower limit or more and the above upper limit or less, it is possible to favorably dye the colored layer and the colored part to have a bluish color tone, and it is possible to exert the effect of the present invention more effectively.

In 100% by weight of the colored part, the content of the anthraquinone dye is preferably 0.050% by weight or more, more preferably 0.070% by weight or more, further preferably 0.090% by weight or more, and is preferably 0.350% by weight or less, more preferably 0.300% by weight or less, further preferably 0.200% by weight or less. When the content of the anthraquinone dye is the above lower limit or more and the above upper limit or less, it is possible to exert the effect of the present invention more effectively.

In 100% by weight of the colored part, the total content of the anthraquinone dye that is a blue coloring matter, and the anthraquinone dye that is a yellow coloring matter is preferably 0.050% by weight or more, more preferably 0.070% by weight or more, further preferably 0.090% by weight or more. In 100% by weight of the colored part, the total content of the anthraquinone dye that is a blue coloring matter, and the anthraquinone dye that is a yellow coloring matter is preferably 0.350% by weight or less, more preferably 0.300% by weight or less, further preferably 0.200% by weight or less. When the total content is the above lower limit or more and the above upper limit or less, it is possible to exert the effect of the present invention more effectively.

In 100% by weight of the colored part, the content of the anthraquinone dye that is a blue coloring matter is preferably 0.040% by weight or more, more preferably 0.060% by weight or more, further preferably 0.070% by weight or more, and is preferably 0.300% by weight or less, more preferably 0.270% by weight or less, further preferably 0.200% by weight or less. When the content of the anthraquinone dye that is a blue coloring matter is the above lower limit or more and the above upper limit or less, it is possible to favorably dye the colored layer and the colored part to have a bluish color tone, and it is possible to exert the effect of the present invention more effectively.

In the colored layer, the colored part, or the interlayer film, a weight ratio of the content of the anthraquinone dye to the content of the perinone dye (content of anthraquinone dye/content of perinone dye) is preferably 2 or more, more preferably 3 or more, further preferably 5 or more. In the colored layer, the colored part, or the interlayer film, a weight ratio of the content of the anthraquinone dye to the content of the perinone dye (content of anthraquinone dye/content of perinone dye) is preferably 60 or less, more preferably 40 or less, further preferably 15 or less. When the weight ratio (content of anthraquinone dye/content of perinone dye) is the above lower limit or more and the above upper limit or less, it is possible to exert the effect of the present invention more effectively.

<Perinone Dye>

The interlayer film contains a perinone dye. The colored layer contains a perinone dye. One kind of the perinone dye may be used alone, and two or more kinds thereof may be used in combination.

In the present specification, the perinone dye is a dye having a structure represented by the following formula (Y).

[Chemical 6]

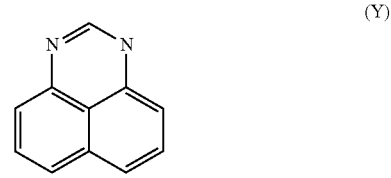

(Y)

From the viewpoint of exerting the effect of the present invention more effectively, it is preferred that the perinone dye be a compound represented by the following formula (Y1).

[Chemical 7]

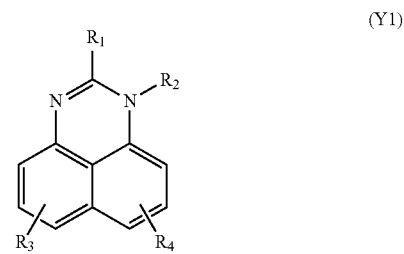

(Y1)

In the formula (Y1), $R_1$ and $R_2$ each independently represent a hydrogen atom, an alkyl group, an aryl group, a heteroaryl group, an amino group, a hydroxyl group, an alkoxy group, a halogen atom, a sulfonyl group, or a thiol group, or represent a condensed ring structure of a five-membered ring or a six-membered ring. In the formula (Y1), $R_3$ and $R_4$ each independently represent a hydrogen atom, an alkyl group, an aryl group, a heteroaryl group, an amino group, a hydroxyl group, an alkoxy group, a halogen atom, a sulfonyl group or a thiol group.

From the viewpoint of exerting the effect of the present invention more effectively, in the formula (Y1), it is preferred that $R_1$ and $R_2$ represent a condensed ring structure of a five-membered ring or a six-membered ring, and it is preferred that $R_3$ and $R_4$ represent a hydrogen atom.

From the viewpoint of exerting the effect of the present invention more effectively, it is more preferred that the perinone dye represented by the formula (Y1) be a compound represented by the following formula (Y2).

[Chemical 8]

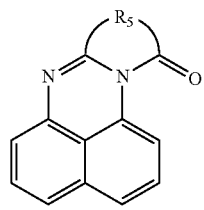

(Y2)

In the formula (Y2), $R_5$ represents a group represented by the following formula (Y21) or the following formula (Y22).

[Chemical 9]

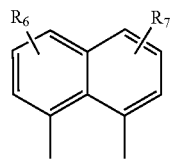

(Y21)

In the formula (Y21), $R_6$ and $R_7$ each independently represent a hydrogen atom, an alkyl group, an aryl group, a heteroaryl group, an amino group, a hydroxyl group, an alkoxy group, a halogen atom, a sulfonyl group or a thiol group.

From the viewpoint of exerting the effect of the present invention more effectively, it is preferred that in the formula (Y21), $R_6$ represent a hydrogen atom.

[Chemical 10]

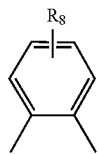

(Y22)

In the formula (Y22), $R_8$ represents a hydrogen atom, an alkyl group, an aryl group, a heteroaryl group, an amino group, a hydroxyl group, an alkoxy group, a halogen atom, a sulfonyl group or a thiol group.

From the viewpoint of exerting the effect of the present invention still more effectively, in the formula (Y22), $R_8$ preferably represents a hydrogen atom or a halogen atom, and more preferably represents a halogen atom.

Examples of the perinone dye represented by the formula (Y1) include Solvent Red 135 (CAS20749-68-2, 71902-17-5), Solvent Red 179 (CAS6829-22-7), and Solvent Orange 60 (CAS61969-47-9, 6925-69-5) and the like.

Examples of the perinone dye include a red coloring matter and an orange coloring matter, and the like. That is, examples of the color tone of the perinone dye include red and orange, and the like.

Examples of the perinone dye that is a red coloring matter include Solvent Red 135 (CAS20749-68-2, 71902-17-5), and Solvent Red 179 (CAS6829-22-7) and the like.

Examples of the perinone dye that is an orange coloring matter include Solvent Orange 60 (CAS61969-47-9, 6925-69-5) and the like.

From the viewpoint of exerting the effect of the present invention more effectively, it is preferred that the perinone dye contain a red coloring matter, and it is more preferred that the perinone dye be a red coloring matter. It is preferred that the colored layer, the colored part or the interlayer film contain a perinone dye that is a red coloring matter.

In 100% by weight of the colored layer, the content of the perinone dye is preferably 0.020% by weight or more, more preferably 0.030% by weight or more, further preferably 0.070% by weight or more, and is preferably 0.380% by weight or less, more preferably 0.350% by weight or less, further preferably 0.300% by weight or less. When the content of the perinone dye is the above lower limit or more and the above upper limit or less, it is possible to exert the effect of the present invention more effectively.

In 100% by weight of the colored part, the content of the perinone dye is preferably 0.003% by weight or more, more preferably 0.004% by weight or more, further preferably 0.010% by weight or more, and is preferably 0.050% by weight or less, more preferably 0.040% by weight or less, further preferably 0.035% by weight or less. When the content of the perinone dye is the above lower limit or more and the above upper limit or less, it is possible to exert the effect of the present invention more effectively.

<Coloring Agent that is Different from Both of Anthraquinone Dye and Perinone Dye>

It is preferred that the interlayer film may contain a coloring agent (hereinafter, sometimes described as coloring agent A) that is different from both of the anthraquinone dye and the perinone dye. The colored layer may contain a coloring agent A. One kind of the coloring agent A may be used alone and two or more kinds thereof may be used in combination.

Examples of the coloring agent A include a dye that is different from both of the anthraquinone dye and the perinone dye, and a pigment and the like.

Examples of the coloring agent A include dyes such as a quinoline dye, a quinophthalone dye, a triphenylmethane dye, a methine dye, and an azo dye; organic pigments such as an azo pigment, an isoindolinone pigment, a phthalocyanine pigment, a quinacridone pigment, a pentaphene pigment, a perylene pigment, an indole pigment, and a dioxazine pigment; inorganic pigments such as carbon black, iron oxide, zinc oxide, and titanium oxide, and the like. The organic pigment may be an organic pigment having a metal atom, and may be an organic pigment not having a metal atom.

Examples of the coloring agent A include a yellow coloring matter, an orange coloring matter, a red coloring matter, a violet coloring matter, a blue coloring matter, a green coloring matter, a brown coloring matter, a black coloring matter, a white coloring matter, and a metallic coloring matter, and the like. In other words, examples of the color tone of the coloring agent A include yellow, orange, red, violet, blue, green, brown, black, white, and metallic color, and the like.

From the viewpoint of exerting the effect of the present invention more effectively, it is preferred that the coloring agent A contain an azo pigment or a quinoline dye. It is preferred that the interlayer film contain an azo pigment or a quinoline dye. It is preferred that the colored layer contain an azo pigment or a quinoline dye. In this case, the coloring agent A, the interlayer film, or the colored layer may contain both of an azo pigment and a quinoline dye.

From the viewpoint of exerting the effect of the present invention more effectively, it is preferred that the coloring agent A contain a yellow coloring matter. It is preferred that the interlayer film contain a yellow coloring matter as the coloring agent A. It is preferred that the colored layer contain a yellow coloring matter as the coloring agent A. It is preferred that the yellow coloring matter be an azo pigment or a quinoline dye.

The kind and the blending amount of the coloring agent A may be appropriately changed depending on the target color tone.

When the coloring agent A contains a yellow coloring matter, the content of the yellow coloring matter in 100% by weight of the colored layer is more than 0% by weight. When the coloring agent A contains a yellow coloring matter, the content of the yellow coloring matter in 100% by weight of the colored layer may be 0.030% by weight or more, may be 0.045% by weight or more, may be 0.075% by weight or more, may be 0.610% by weight or less, may be 0.400% by weight or less, and may be 0.310% by weight or less.

When the coloring agent A contains a yellow coloring matter, the content of the yellow coloring matter in 100% by weight of the colored part is more than 0% by weight. When the coloring agent A contains a yellow coloring matter, the content of the yellow coloring matter in 100% by weight of the colored part may be 0.004% by weight or more, may be 0.006% by weight or more, may be 0.010% by weight or more, may be 0.080% by weight or less, may be 0.050% by weight or less, and may be 0.040% by weight or less.

When the coloring agent A contains an azo pigment or a quinoline dye, the respective contents of the azo pigment and the quinoline dye in 100% by weight of the colored layer are more than 0% by weight. When the coloring agent A contains an azo pigment or a quinoline dye, the respective contents of the azo pigment and the quinoline dye in 100% by weight of the colored layer may be 0.030% by weight or more, may be 0.045% by weight or more, and may be 0.075% by weight or more. When the coloring agent A contains an azo pigment or a quinoline dye, the respective contents of the azo pigment and the quinoline dye in 100% by weight of the colored layer may be 0.400% by weight or less, may be 0.350% by weight or less, and may be 0.300% by weight or less.

When the coloring agent A contains an azo pigment or a quinoline dye, the respective contents of the azo pigment and the quinoline dye in 100% by weight of the colored part are more than 0% by weight. When the coloring agent A contains an azo pigment or a quinoline dye, the respective contents of the azo pigment and the quinoline dye in 100% by weight of the colored part may be 0.004% by weight or more, may be 0.006% by weight or more, and may be 0.010% by weight or more. When the coloring agent A contains an azo pigment or a quinoline dye, the respective contents of the azo pigment and the quinoline dye in 100% by weight of the colored part may be 0.050% by weight or less, may be 0.040% by weight or less, and may be 0.038% by weight or less.

When the coloring agent A contains an azo pigment or a quinoline dye, the respective contents of the azo pigment and the quinoline dye in 100% by weight of the colored part are more than 0% by weight. When the coloring agent A contains a pigment, the content of the pigment in 100% by weight of the colored layer is preferably 0.008% by weight or more, more preferably 0.015% by weight or more, further preferably 0.065% by weight or more, and is preferably 0.460% by weight or less, more preferably 0.400% by weight or less, further preferably 0.300% by weight or less. When the content of the pigment is the above lower limit or more and the above upper limit or less, it is possible to exert the effect of the present invention more effectively. When the content of the pigment is the above upper limit or less, it is possible to further lower the haze of laminated glass.

When the coloring agent A contains a pigment, the content of the pigment in 100% by weight of the colored part is more than 0% by weight. When the coloring agent A contains a pigment, the content of the pigment in 100% by weight of the colored part is preferably 0.001% by weight or more, more preferably 0.002% by weight or more, further preferably 0.010% by weight or more, and is preferably 0.060% by weight or less, more preferably 0.050% by weight or less, further preferably 0.030% by weight or less. When the content of the pigment is the above lower limit or more and the above upper limit or less, it is possible to exert the effect of the present invention more effectively. When the content of the pigment is the above upper limit or less, it is possible to further lower the haze of laminated glass.

When the colored layer contains the coloring agent A, the content of the coloring agent A in 100% by weight of the colored layer is more than 0% by weight. In 100% by weight of the colored layer, the content of the coloring agent A is preferably 0.030% by weight or more, more preferably 0.045% by weight or more, further preferably 0.075% by weight or more, and is preferably 0.610% by weight or less, more preferably 0.400% by weight or less, further preferably 0.310% by weight or less. When the content of the coloring agent A is the above lower limit or more and the above upper limit or less, it is possible to exert the effect of the present invention more effectively.

When the colored part contains the coloring agent A, the content of the coloring agent A in 100% by weight of the colored part is more than 0% by weight. In 100% by weight of the colored part, the content of the coloring agent A is preferably 0.004% by weight or more, more preferably 0.006% by weight or more, further preferably 0.010% by weight or more, and is preferably 0.080% by weight or less, more preferably 0.050% by weight or less, further preferably 0.040% by weight or less. When the content of the coloring agent A is the above lower limit or more and the above upper limit or less, it is possible to exert the effect of the present invention more effectively.

(Light Stabilizer)

It is preferred that the interlayer film contain a light stabilizer. It is preferred that the first layer contain a light stabilizer. It is preferred that the second layer contain a light stabilizer. It is preferred that the third layer contain a light stabilizer. It is preferred that the colored layer contain a light stabilizer. By using the light stabilizer, it is possible to effectively prevent degradation of the resin, and for example, it is possible to effectively suppress foaming in an end part of the laminated glass. By using the light stabilizer, the visible light transmittance is more difficult to decrease. One kind of the light stabilizer may be used alone and two or more kinds thereof may be used in combination.

In a laminated glass prepared with an interlayer film containing a dye and a light stabilizer, the weatherability is still more prone to deteriorate, and the color shade in the colored part is still more prone to change. In contrast to this, in the interlayer film according to the present invention, since specific dyes are used, it is possible to further enhance the weatherability of the laminated glass, and it is possible to exert the effect of the present invention more effectively even when the colored layer contains a light stabilizer in addition to the anthraquinone dye and the perinone dye.

From the viewpoint of exerting the effect of the present invention more effectively, the light stabilizer is preferably a light stabilizer in which a carbon atom is bonded to a nitrogen atom of a piperidine structure, and more preferably a hindered amine light stabilizer.

Examples of the hindered amine light stabilizer include hindered amine light stabilizers in which a carbon atom, or an oxygen atom or a hydrogen atom of an alkoxy group is bonded to a nitrogen atom of a piperidine structure. From the viewpoint of further suppressing the discoloration, a hindered amine light stabilizer in which a carbon atom, or an oxygen atom of an alkoxy group is bonded to a nitrogen atom of a piperidine structure is preferred. The hindered amine light stabilizer is preferably a hindered amine light stabilizer in which a carbon atom is bonded to a nitrogen atom of a piperidine structure, and also preferably a hindered amine light stabilizer in which an oxygen atom of an alkoxy group is bonded to a nitrogen atom of a piperidine structure.

In the light stabilizer in which a carbon atom is bonded to a nitrogen atom of a piperidine structure, the carbon atom bonded to the nitrogen atom of the piperidine structure is preferably a carbon atom of an alkyl group or an alkylene group bonded to the nitrogen atom of the piperidine structure.

Examples of the hindered amine light stabilizer in which a carbon atom is bonded to a nitrogen atom of a piperidine structure include "Tinuvin 765" and "Tinuvin 622SF" available from BASF Japan Ltd., and "ADK STAB LA-52" available from ADEKA, and the like.

Examples of the hindered amine light stabilizer in which an alkoxy group is bonded to a nitrogen atom of a piperidine structure include "Tinuvin XT-850FF" and "Tinuvin XT-855FF" available from BASF Japan Ltd., and "ADK STAB LA-81" available from ADEKA, and the like.

Examples of the hindered amine light stabilizer in which a hydrogen atom is bonded to a nitrogen atom of a piperidine structure include "Tinuvin 770DF" available from BASF Japan Ltd., and "Hostavin N24" available from Clariant, and the like.

From the viewpoint of exerting the effect of the present invention more effectively, the light stabilizer has a molecular weight of preferably 2000 or less, more preferably 1000 or less, further preferably 700 or less. The molecular weight of the light stabilizer may be 100 or more.

In 100% by weight of the interlayer film or in 100% by weight of a layer containing the light stabilizer (a first layer, a second layer, a third layer, or a colored layer), the content of the light stabilizer is preferably 0.0025% by weight or more, more preferably 0.025% by weight or more, and is preferably 0.5% by weight or less, more preferably 0.3% by weight or less. When the content of the light stabilizer is the above lower limit or more and the above upper limit or less, it is possible to exert the effect of the present invention more effectively.

(Thermoplastic Resin)

It is preferred that the interlayer film contain a thermoplastic resin (hereinafter, sometimes described as a thermoplastic resin (0)). It is preferred that the interlayer film contain a polyvinyl acetal resin (hereinafter, sometimes described as a polyvinyl acetal resin (0)) as the thermoplastic resin (0). It is preferred that the first layer contain a thermoplastic resin (hereinafter, sometimes described as a thermoplastic resin (1)). It is preferred that the first layer contain a polyvinyl acetal resin (hereinafter, sometimes described as a polyvinyl acetal resin (1)) as the thermoplastic resin (1). It is preferred that the second layer contain a thermoplastic resin (hereinafter, sometimes described as a thermoplastic resin (2)). It is preferred that the second layer contain a polyvinyl acetal resin (hereinafter, sometimes described as a polyvinyl acetal resin (2)) as the thermoplastic resin (2). It is preferred that the third layer contain a thermoplastic resin (hereinafter, sometimes described as a thermoplastic resin (3)). It is preferred that the third layer contain a polyvinyl acetal resin (hereinafter, sometimes described as a polyvinyl acetal resin (3)) as the thermoplastic resin (3). It is preferred that the colored layer contain a thermoplastic resin (hereinafter, sometimes described as a thermoplastic resin (4)). It is preferred that the colored layer contain a polyvinyl acetal resin (hereinafter, sometimes described as a polyvinyl acetal resin (4)) as the thermoplastic resin (4). The thermoplastic resin (1), the thermoplastic resin (2), the thermoplastic resin (3), and the thermoplastic resin (4) may be the same or different from one another. For still higher sound insulating property, it is preferred that the thermoplastic resin (1) be different from the thermoplastic resin (2) and the thermoplastic resin (3). Each of the polyvinyl acetal resin (1), the polyvinyl acetal resin (2), the polyvinyl acetal resin (3), and the polyvinyl acetal resin (4) may be the same or different from one another. For still higher sound insulating property, it is preferred that the polyvinyl acetal resin (1) be different from the polyvinyl acetal resin (2) and the polyvinyl acetal resin (3). One kind of each of the thermoplastic resin (0), the thermoplastic resin (1), the thermoplastic resin (2), the thermoplastic resin (3), and the thermoplastic resin (4) may be used alone and two or more kinds thereof may be used in combination. One kind of each of the polyvinyl acetal resin (0), the polyvinyl acetal resin (1), the polyvinyl acetal resin (2), the polyvinyl acetal resin (3), and the polyvinyl acetal resin (4) may be used alone and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a (meth)acrylic resin, a polyolefin resin, an ionomer resin, a polyvinyl alcohol resin, and the like. Thermoplastic resins other than these may be used.

For example, the polyvinyl acetal resin can be produced by acetalizing polyvinyl alcohol (PVA) with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally lies within the range of 70% by mole to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more and is preferably 5000 or less, more preferably 4000 or less, further preferably 3500 or less. When the average polymerization degree is the above lower limit or more, the penetration resistance of laminated glass is further enhanced. When the average polymerization degree is the above-described upper limit or less, formation of an interlayer film is facilitated.

The average polymerization degree of the polyvinyl alcohol is determined by a method in accordance with JIS K6726 "Testing methods for polyvinyl alcohol".

The number of carbon atoms of the acetal group contained in the polyvinyl acetal resin is not particularly limited. The aldehyde used at the time of producing the polyvinyl acetal resin is not particularly limited. The number of carbon atoms of the acetal group in the polyvinyl acetal resin is preferably 3 to 5, more preferably 3 or 4. When the number of carbon atoms of the acetal group in the polyvinyl acetal resin is 3 or more, the glass transition temperature of the interlayer film is sufficiently lowered. The number of carbon atoms of the acetal group in the polyvinyl acetal resin may be 4 or 5.

The aldehyde is not particularly limited. In general, an aldehyde with 1 to 10 carbon atoms is preferably used. Examples of the aldehyde with 1 to 10 carbon atoms include propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, formaldehyde, acetaldehyde, benzaldehyde, and the like. The aldehyde is preferably propionaldehyde, n-butyraldehyde, isobutyraldehyde, n-hexylaldehyde, or n-valeraldehyde, more preferably propionaldehyde, n-butyraldehyde or isobutyraldehyde, and further preferably n-butyraldehyde. One kind of the aldehyde may be used alone, and two or more kinds thereof may be used in combination.

The content of the hydroxyl group (the amount of hydroxyl groups) of the polyvinyl acetal resin (0) is preferably 15% by mole or more, more preferably 18% by mole or more and is preferably 40% by mole or less, more preferably 35% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

A content of the hydroxyl group (the amount of hydroxyl groups) of the polyvinyl acetal resin (1) is preferably 17% by mole or more, more preferably 20% by mole or more, further preferably 22% by mole or more and is preferably 28% by mole or less, more preferably 27% by mole or less, further preferably 25% by mole or less, especially preferably 24% by mole or less. When the content of the hydroxyl group is the above lower limit or more, the mechanical strength of the interlayer film is further enhanced. In particular, when the content of the hydroxyl group of the polyvinyl acetal resin (1) is 20% by mole or more, the resin is high in reaction efficiency and is excellent in productivity, and moreover, when being 28% by mole or less, the sound insulating property of laminated glass is further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the first layer, is the same as a preferred range of the content of the hydroxyl group of the polyvinyl acetal resin (1). A preferred range of the content of the hydroxyl group of the polyvinyl acetal resin (4) when the colored layer is not embedded in the second layer and the third layer and the colored layer is not a surface layer of the interlayer film, is the same as a preferred range of the content of the hydroxyl group of the polyvinyl acetal resin (1).

The content of the hydroxyl group (hydroxyl group amount) of the polyvinyl acetal resin (2) and the polyvinyl acetal resin (3) is preferably 25% by mole or more, more preferably 28% by mole or more, more preferably 30% by mole or more, still more preferably 31.5% by mole or more, further preferably 32% by mole or more, especially preferably 33% by mole or more. The content of the hydroxyl group (hydroxyl group amount) of the polyvinyl acetal resin (2) and the polyvinyl acetal resin (3) is preferably 38% by mole or less, more preferably 37% by mole or less, further preferably 36.5% by mole or less, especially preferably 36% by mole or less. When the content of the hydroxyl group is the above lower limit or more, the adhesive strength of the interlayer film is further enhanced. Moreover, when the content of the hydroxyl group is the above upper limit or less, the flexibility of the interlayer film is enhanced and the handling of the interlayer film is facilitated.

A preferred range of the content of the hydroxyl group of the polyvinyl acetal resin (4) when the colored layer is embedded in the second layer or the third layer, is the same as a preferred range of the content of the hydroxyl group of the polyvinyl acetal resin (2) and the polyvinyl acetal resin (3). A preferred range of the content of the hydroxyl group of the polyvinyl acetal resin (4) when the colored layer is a surface layer of the interlayer film, is the same as a preferred range of the content of the hydroxyl group of the polyvinyl acetal resin (2) and the polyvinyl acetal resin (3).

From the viewpoint of further enhancing the sound insulating property, it is preferred that the content of the hydroxyl group of the polyvinyl acetal resin (1) be lower than the content of the hydroxyl group of the polyvinyl acetal resin (2). From the viewpoint of further enhancing the sound insulating property, it is preferred that the content of the hydroxyl group of the polyvinyl acetal resin (1) be lower than the content of the hydroxyl group of the polyvinyl acetal resin (3). An absolute value of a difference between the content of the hydroxyl group of the polyvinyl acetal resin (1) and the content of the hydroxyl group of the polyvinyl acetal resin (2) is defined as absolute value A, and an absolute value of a difference between the content of the hydroxyl group of the polyvinyl acetal resin (1) and the content of the hydroxyl group of the polyvinyl acetal resin (3) is defined as absolute value B. From the viewpoint of further enhancing the sound insulating property, each of the absolute value A and the absolute value B is preferably 1% by mole or more, more preferably 5% by mole or more, further preferably 9% by mole or more, especially preferably 10% by mole or more, most preferably 12% by mole or more. Each of the absolute value A and the absolute value B is preferably 20% by mole or less.

When the colored layer is embedded in the first layer, there may be a case that the colored layer is not embedded in the second layer and the third layer, and the colored layer is not a surface layer of the interlayer film. In these cases, from the viewpoint of further enhancing the sound insulating property, it is preferred that the content of the hydroxyl group of the polyvinyl acetal resin (4) be lower than the content of the hydroxyl group of the polyvinyl acetal resin (2). From the viewpoint of further enhancing the sound insulating property, it is preferred that the content of the hydroxyl group of the polyvinyl acetal resin (4) be lower than the content of the hydroxyl group of the polyvinyl acetal resin (3). An absolute value of a difference between the content of the hydroxyl group of the polyvinyl acetal resin (4) and the content of the hydroxyl group of the polyvinyl acetal resin (2) is defined as absolute value C, and an absolute value of a difference between the content of the hydroxyl group of the polyvinyl acetal resin (4) and the content of the hydroxyl group of the polyvinyl acetal resin (3) is defined as absolute value D. From the viewpoint of further enhancing the sound insulating property, each of the absolute value C and the absolute value D is preferably 1% by mole or more, more preferably 5% by mole or more, further preferably 9% by mole or more, especially preferably 10% by mole or more, most preferably 12% by mole or more. Each of the absolute value C and the absolute value D is preferably 20% by mole or less.

There are the cases that the colored layer is embedded in the second layer or in the third layer, and that the colored layer is a surface layer of the interlayer film. In these cases, from the viewpoint of further enhancing the sound insulating property, it is preferred that the content of the hydroxyl group of the polyvinyl acetal resin (1) be lower than the content of the hydroxyl group of the polyvinyl acetal resin (4). From the viewpoint of still further enhancing the sound insulating property, the absolute value of a difference between the content of the hydroxyl group of the polyvinyl acetal resin (1) and the content of the hydroxyl group of the polyvinyl acetal resin (4) is preferably 1% by mole or more, more preferably 5% by mole or more, further preferably 9% by mole or more, especially preferably 10% by mole or more, most preferably 12% by mole or more. An absolute value of difference between the content of the hydroxyl group of the polyvinyl acetal resin (1) and the content of the hydroxyl group of the polyvinyl acetal resin (4) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be determined in accordance with JIS K6728 "Testing methods for polyvinyl butyral".

The acetylation degree (the amount of acetyl groups) of the polyvinyl acetal resin (0) is preferably 0.1% by mole or more, more preferably 0.3% by mole or more, further preferably 0.5% by mole or more and is preferably 30% by mole or less, more preferably 25% by mole or less, and further preferably 20% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced.

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more and is preferably 30% by mole or less, more preferably 25% by mole or less, further preferably 24% by mole or less, especially preferably 20% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced. In particular, when the acetylation degree of the polyvinyl acetal resin (1) is 0.1% by mole or more and is 25% by mole or less, the resulting laminated glass is excellent in penetration resistance.

A preferred range of the acetylation degree of the polyvinyl acetal resin (4) when the colored layer is embedded in the first layer, is the same as a preferred range of the acetylation degree of the polyvinyl acetal resin (1). A preferred range of the acetylation degree of the polyvinyl acetal resin (4) when the colored layer is not embedded in the second layer and the third layer and the colored layer is not a surface layer of the interlayer film, is the same as a preferred range of the acetylation degree of the polyvinyl acetal resin (1).

The acetylation degree (acetyl group amount) of each of the polyvinyl acetal resin (2) and the polyvinyl acetal resin (3) is preferably 0.01% by mole or more, more preferably 0.5% by mole or more, and is preferably 10% by mole or less, more preferably 2% by mole or less. When the acetylation degree is the above lower limit or more, the compatibility between the polyvinyl acetal resin and a plasticizer is enhanced. When the acetylation degree is the above upper limit or less, the moisture resistance of the interlayer film and laminated glass is enhanced.

A preferred range of the acetylation degree of the polyvinyl acetal resin (4) when the colored layer is embedded in the second layer or the third layer, is the same as a preferred range of the acetylation degree of the polyvinyl acetal resin (2) and the polyvinyl acetal resin (3). A preferred range of the acetylation degree of the polyvinyl acetal resin (4) when the colored layer is a surface layer of the interlayer film, is the same as a preferred range of the acetylation degree of the polyvinyl acetal resin (2) and the polyvinyl acetal resin (3).

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be determined in accordance with JIS K6728 "Testing methods for polyvinyl butyral".

The acetalization degree of the polyvinyl acetal resin (0) (the butyralization degree in the case of a polyvinyl butyral resin) is preferably 60% by mole or more and more preferably 63% by mole or more and is preferably 85% by mole or less, more preferably 75% by mole or less, further preferably 70% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

The acetalization degree of the polyvinyl acetal resin (1) (the butyralization degree in the case of a polyvinyl butyral resin) is preferably 47% by mole or more and more preferably 60% by mole or more, and is preferably 85% by mole or less, more preferably 80% by mole or less, further preferably 75% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the first layer, is the same as a preferred range of the acetalization degree of the polyvinyl acetal resin (1). A preferred range of the acetalization degree of the polyvinyl acetal resin (4) when the colored layer is not embedded in the second layer and the third layer and the colored layer is not a surface layer of the interlayer film, is the same as a preferred range of the acetalization degree of the polyvinyl acetal resin (1).

The acetalization degree of the polyvinyl acetal resin (2) and the polyvinyl acetal resin (3) (the butyralization degree in the case of a polyvinyl butyral resin) is preferably 55% by mole or more and more preferably 60% by mole or more and is preferably 75% by mole or less and more preferably 71% by mole or less. When the acetalization degree is the above lower limit or more, the compatibility between the polyvinyl acetal resin and a plasticizer is enhanced. When the acetalization degree is the above upper limit or less, the reaction time required for producing the polyvinyl acetal resin is shortened.

A preferred range of the acetalization degree of the polyvinyl acetal resin (4) when the colored layer is embedded in the second layer or the third layer, is the same as a preferred range of the acetalization degree of the polyvinyl acetal resin (2) and the polyvinyl acetal resin (3). A preferred range of the acetalization degree of the polyvinyl acetal resin (4) when the colored layer is a surface layer of the interlayer film, is the same as a preferred range of the acetalization degree of the polyvinyl acetal resin (2) and the polyvinyl acetal resin (3).

The acetalization degree is determined in the following manner. From the total amount of the ethylene group in the main chain, the amount of the ethylene group to which the hydroxyl group is bonded and the amount of the ethylene group to which the acetyl group is bonded are subtracted. The obtained value is divided by the total amount of the ethylene group in the main chain to obtain a mole fraction. The mole fraction represented in percentage is the acetalization degree.

In this connection, it is preferred that the content of the hydroxyl group (the amount of hydroxyl groups), the acetalization degree (the butyralization degree) and the acetylation degree be calculated from the results determined by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

In 100% by weight of the thermoplastic resin contained in the interlayer film, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the interlayer film, the content of the polyvinyl acetal resin is preferably 100% by weight or less. It is preferred that the main ingredient (50% by weight or more) of the thermoplastic resin of the interlayer film be a polyvinyl acetal resin.

In 100% by weight of the thermoplastic resin contained in the first layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the first layer, the content of the polyvinyl acetal resin is preferably 100% by weight or less. It is preferred that the main ingredient (50% by weight or more) of the thermoplastic resin of the first layer be a polyvinyl acetal resin.

In 100% by weight of the thermoplastic resin contained in the second layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the second layer, the content of the polyvinyl acetal resin is preferably 100% by weight or less. It is preferred that the main ingredient (50% by weight or more) of the thermoplastic resin of the second layer be a polyvinyl acetal resin.

In 100% by weight of the thermoplastic resin contained in the third layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the third layer, the content of the polyvinyl acetal resin is preferably 100% by weight or less. It is preferred that the main ingredient (50% by weight or more) of the thermoplastic resin of the third layer be a polyvinyl acetal resin.

In 100% by weight of the thermoplastic resin contained in the colored layer, the content of the polyvinyl acetal resin is preferably 10% by weight or more, more preferably 30% by weight or more, still more preferably 50% by weight or more, further preferably 70% by weight or more, especially preferably 80% by weight or more, most preferably 90% by weight or more. In 100% by weight of the thermoplastic resin contained in the colored layer, the content of the polyvinyl acetal resin is preferably 100% by weight or less. It is preferred that the main ingredient (50% by weight or more) of the thermoplastic resin of the colored layer be a polyvinyl acetal resin.

(Plasticizer)

From the viewpoint of further enhancing the adhesive force of an interlayer film, it is preferred that the interlayer film according to the present invention contain a plasticizer (hereinafter, sometimes described as a plasticizer (0)). It is preferred that the first layer contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). It is preferred that the colored layer contain a plasticizer (hereinafter, sometimes described as a plasticizer (4)). When the thermoplastic resin contained in an interlayer film is a polyvinyl acetal resin, it is especially preferred that the interlayer film (the respective layers) contain a plasticizer. It is preferred that a layer containing a polyvinyl acetal resin contain a plasticizer.

The plasticizer is not particularly limited. As the plasticizer, a conventionally known plasticizer can be used. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. It is preferred that the plasticizer be an organic ester plasticizer. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms, and the like. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 11]

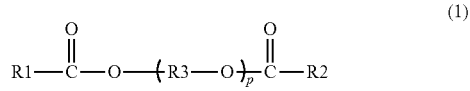

(1)

In the formula (1), R1 and R2 each represent an organic group with 2 to 10 carbon atoms, R3 represents an ethylene group, an isopropylene group, or an n-propylene group, and p represents an integer of 3 to 10. R1 and R2 in the formula (1) each are preferably an organic group with 5 to 10 carbon atoms, and more preferably an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate.

In the interlayer film, the content of the plasticizer (0) relative to 100 parts by weight of the thermoplastic resin (0) is defined as content (0). The content (0) is preferably 5 parts by weight or more, more preferably 25 parts by weight or more, further preferably 30 parts by weight or more, and is preferably 100 parts by weight or less, more preferably 60 parts by weight or less, further preferably 50 parts by weight or less. When the content (0) is the above lower limit or more, the penetration resistance of laminated glass is further enhanced. When the content (0) is the above upper limit or less, the transparency of the interlayer film is further enhanced.

In the first layer, the content of the plasticizer (1) per 100 parts by weight of the thermoplastic resin (1) is defined as content (1). The content (1) is preferably 50 parts by weight or more, more preferably 55 parts by weight or more, further preferably 60 parts by weight or more. The content (1) is preferably 100 parts by weight or less, more preferably 90 parts by weight or less, further preferably 85 parts by weight or less, especially preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

When the colored layer is embedded in the first layer, a preferred range of the content of the plasticizer (4) relative to 100 parts by weight of the thermoplastic resin (4) (hereinafter, sometimes described as content (4)) is the same as a preferred range of the content (1) in the colored layer. When the colored layer is not embedded in the second layer and the third layer, and the colored layer is not a surface layer of the interlayer film, a preferred range of the content of the plasticizer (4) relative to 100 parts by weight of the thermoplastic resin (4) (hereinafter, sometimes described as content (4)) is the same as a preferred range of the content (1) in the colored layer.

In the second layer, the content of the plasticizer (2) relative to 100 parts by weight of the thermoplastic resin (2) is defined as a content (2). In the third layer, the content of the plasticizer (3) relative to 100 parts by weight of the thermoplastic resin (3) is defined as content (3). Each of the content (2) and the content (3) is preferably 5 parts by weight or more, more preferably 10 parts by weight or more, still more preferably 15 parts by weight or more, further preferably 20 parts by weight or more, especially preferably 24 parts by weight or more, and most preferably 25 parts by weight or more. Each of the content (2) and the content (3) is preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

A preferred range of the content of the plasticizer (4) relative to 100 parts by weight of the thermoplastic resin (4) (hereinafter, sometimes described as content (4)) when the colored layer is embedded in the second layer or the third layer, is the same as a preferred range of the content (2) and the content (3). A preferred range of the content of the plasticizer (4) relative to 100 parts by weight of the thermoplastic resin (4) (hereinafter, sometimes described as content (4)) when the colored layer is a surface layer of the interlayer film, is the same as a preferred range of the content (2) and the content (3).

For the purpose of enhancing the sound insulating property of laminated glass, it is preferred that the content (1) be larger than the content (2) and it is preferred that the content (1) be larger than the content (3).

For the purpose of enhancing the sound insulating property of laminated glass, it is preferred that the content (4) be larger than the content (2) and it is preferred that the content (4) be larger than the content (3), when the colored layer is embedded in the first layer and when the colored layer is not a surface layer of the interlayer film.

For the purpose of enhancing the sound insulating property of laminated glass, it is preferred that the content (1) be larger than the content (4) when the colored layer is embedded in the second layer or the third layer, and when the colored layer is a surface layer of the interlayer film.

From the viewpoint of further enhancing the sound insulating property of laminated glass, each of the absolute value of difference between the content (2) and the content (1) and the absolute value of difference between the content (3) and the content (1) is preferably 10 parts by weight or more, more preferably 15 parts by weight or more, and further preferably 20 parts by weight or more. Each of the absolute value of difference between the content (2) and the content (1) and the absolute value of difference between the content (3) and the content (1) is preferably 80 parts by weight or less, more preferably 75 parts by weight or less, further preferably 70 parts by weight or less.

When the colored layer is embedded in the first layer, there may be a case that the colored layer is not embedded in the second layer and the third layer, and the colored layer is not a surface layer of the interlayer film. In this case, from the viewpoint of further enhancing the sound insulating property of laminated glass, each of the absolute value of difference between the content (2) and the content (4) and the absolute value of difference between the content (3) and the content (4) is preferably 10 parts by weight or more, more preferably 15 parts by weight or more, and further preferably 20 parts by weight or more. Each of the absolute value of difference between the content (2) and the content (4) and the absolute value of difference between the content (3) and the content (4) is preferably 80 parts by weight or less, more preferably 75 parts by weight or less, further preferably 70 parts by weight or less.

When the colored layer is embedded in the second layer or the third layer, and when the colored layer is a surface layer of the interlayer film, the absolute value of difference between the content (4) and the content (1) is preferably 10 parts by weight or more, more preferably 15 parts by weight or more, and further preferably 20 parts by weight or more from the viewpoint of further enhancing the sound insulating property of laminated glass. The absolute value of difference between the content (4) and the content (1) is preferably 80 parts by weight or less, more preferably 75 parts by weight or less, further preferably 70 parts by weight or less.

(Heat Shielding Substance)

It is preferred that the interlayer film contain a heat shielding substance. It is preferred that the first layer contain a heat shielding substance. It is preferred that the second layer contain a heat shielding substance. It is preferred that the third layer contain a heat shielding substance. It is preferred that the colored layer contain a heat shielding substance. One kind of the heat shielding substance may be used alone, and two or more kinds thereof may be used in combination.

It is preferred that the heat shielding substance contain at least one kind of Ingredient X among a phthalocyanine compound, a naphthalocyanine compound, and an anthracyanine compound or contain heat shielding particles. In this case, the heat shielding compound may be constituted of both of the Ingredient X and the heat shielding particles. The heat shielding substance can correspond to the above-described coloring agent.

Ingredient X:

It is preferred that the interlayer film contain at least one kind of Ingredient X among a phthalocyanine compound, a naphthalocyanine compound, and an anthracyanine compound. It is preferred that the first layer contain the Ingredient X. It is preferred that the second layer contain the Ingredient X. It is preferred that the third layer contain the Ingredient X. It is preferred that the colored layer contain the Ingredient X. The Ingredient X is a heat shielding substance. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

Examples of the Ingredient X include phthalocyanine, a derivative of phthalocyanine, naphthalocyanine, a derivative of naphthalocyanine, anthracyanine, and a derivative of anthracyanine, and the like. It is preferred that each of the phthalocyanine compound and the derivative of phthalocyanine have a phthalocyanine skeleton. It is preferred that each of the naphthalocyanine compound and the derivative of naphthalocyanine have a naphthalocyanine skeleton. It is preferred that each of the anthracyanine compound and the derivative of anthracyanine have an anthracyanine skeleton.

From the viewpoint of further enhancing the heat shielding property of the interlayer film and the laminated glass, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. From the viewpoint of still further enhancing the heat shielding property of the interlayer film and the laminated glass, it is preferred that the Ingredient X have a structural unit in which an oxygen atom is bonded to a vanadium atom.

In 100% by weight of the interlayer film or in 100% by weight of a layer containing the Ingredient X (a first layer, a second layer, a third layer, or a colored layer), the content of the Ingredient X is preferably 0.001% by weight or more, more preferably 0.005% by weight or more, further preferably 0.01% by weight or more, especially preferably 0.02% by weight or more. In 100% by weight of the interlayer film or in 100% by weight of a layer containing the Ingredient X (a first layer, a second layer, a third layer, or a colored layer), the content of the Ingredient X is preferably 0.2% by weight or less, more preferably 0.1% by weight or less, further preferably 0.05% by weight or less, especially preferably 0.04% by weight or less. When the content of the Ingredient X is the above lower limit or more and the above upper limit or less, the heat shielding property is sufficiently enhanced and the visible light transmittance is sufficiently enhanced. For example, it is possible to make the visible light transmittance 70% or more.

Heat Shielding Particles:

It is preferred that the interlayer film contain heat shielding particles. It is preferred that the first layer contain the heat shielding particles. It is preferred that the second layer contain the heat shielding particles. It is preferred that the third layer contain the heat shielding particles. It is preferred that the colored layer contain the heat shielding particles. The heat shielding particle is of a heat shielding substance. By the use of heat shielding particles, infrared rays (heat rays) can be effectively cut off. One kind of the heat shielding particles may be used alone, and two or more kinds thereof may be used in combination.

From the viewpoint of further enhancing the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, and is preferably 0.1 μm or less, more preferably 0.05 μm or less. When the average particle diameter is the above lower limit or more, the heat ray shielding property is sufficiently enhanced. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 0.01% by weight or more, more preferably 0.1% by weight or more, further preferably 1% by weight or more, especially preferably 1.5% by weight or more. In 100% by weight of the interlayer film or in 100% by weight of a layer containing the heat shielding particles (a first layer, a second layer, a third layer, or a colored layer), the content of the heat shielding particles (in particular, the content of tungsten oxide particles) is preferably 6% by weight or less, more preferably 5.5% by weight or less, further preferably 4% by weight or less, especially preferably 3.5% by weight or less, most preferably 3% by weight or less. When the content of the heat shielding particles is the above lower limit or more and the above upper limit or less, the heat shielding property is sufficiently enhanced and the visible light transmittance is sufficiently enhanced.

(Metal Salt)

It is preferred that the interlayer film include at least one kind of metal salt (hereinafter, sometimes described as Metal salt M) of alkali metal salts and alkali earth metal salts. It is preferred that the first layer contain the Metal salt M. It is preferred that the second layer contain the Metal salt M. It is preferred that the third layer contain the Metal salt M. It is preferred that the colored layer contain the Metal salt M. The alkali earth metal means six metals of Be, Mg, Ca, Sr, Ba, and Ra. By the use of the Metal salt M, controlling the adhesivity between the interlayer film and a lamination glass member such as a glass plate or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal among K and Mg.

As the metal salt M, an alkali metal salt of an organic acid having 2 to 16 carbon atoms, and an alkali earth metal salt of an organic acid having 2 to 16 carbon atoms can be used. The metal salt M may include a magnesium carboxylate having 2 to 16 carbon atoms, or a potassium carboxylate having 2 to 16 carbon atoms.

Examples of the magnesium carboxylate with 2 to 16 carbon atoms and the potassium carboxylate with 2 to 16 carbon atoms include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in an interlayer film containing the Metal salt M or a layer containing the Metal salt M (a first layer, a second layer, a third layer, or a colored layer) is preferably 5 ppm or more, more preferably 10 ppm or more, further preferably 20 ppm or more, and is preferably 300 ppm or less, more preferably 250 ppm or less, further preferably 200 ppm or less. When the total of the contents of Mg and K is the above lower limit or more and the above upper limit or less, the adhesivity between the interlayer film and a lamination glass member (e.g., glass plate) or the adhesivity between respective layers in the interlayer film can be further well controlled.

(Ultraviolet Ray Screening Agent)

It is preferred that the interlayer film contain an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. It is preferred that the colored layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure (a benzotriazole compound), an ultraviolet ray screening agent having a benzophenone structure (a benzophenone compound), an ultraviolet ray screening agent having a triazine structure (a triazine compound), an ultraviolet ray screening agent having a malonic acid ester structure (a malonic acid ester compound), an ultraviolet ray screening agent having an oxanilide structure (an oxanilide compound), an ultraviolet ray screening agent having a benzoate structure (a benzoate compound), and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure, or an ultraviolet ray screening agent having a benzoate structure. The ultraviolet ray screening agent is more preferably an ultraviolet ray screening agent having a benzotriazole structure or an ultraviolet ray screening agent having a benzophenone structure, and is further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface may be coated. Examples of the coating material for the surface of the ultraviolet ray screening agent containing a metal oxide include an insulating metal oxide, a hydrolyzable organosilicon compound, a silicone compound, and the like.

Examples of the insulating metal oxide include silica, alumina, zirconia, and the like. For example, the insulating metal oxide has a band-gap energy of 5.0 eV or more.

Examples of the ultraviolet ray screening agent having a benzotriazole structure include 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.), 2-(2'-hydroxy-3',5'-di-amylphenyl)benzotriazole ("Tinuvin 328" available from BASF Japan Ltd.), and the like. It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray screening performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl 2-(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxalanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 0.1% by weight or more, more preferably 0.2% by weight or more, further preferably 0.3% by weight or more, especially preferably 0.5% by weight or more. In this case, decrease in visible light transmittance after a lapse of the term is further suppressed. In 100% by weight of the interlayer film or in 100% by weight of a layer containing the ultraviolet ray screening agent (a first layer, a second layer, a third layer, or a colored layer), the content of the ultraviolet ray screening agent and the content of the benzotriazole compound are preferably 2.5% by weight or less, more preferably 2% by weight or less, further preferably 1% by weight or less, especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film contain an oxidation inhibitor. It is preferred that the first layer contain an oxidation inhibitor. It is preferred that the second layer contain an oxidation inhibitor. It is preferred that the third layer contain an oxidation inhibitor. It is preferred that the colored layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butyl hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid) ethylenebis(oxyethylene), and the like. One kind or two or more kinds among these oxidation inhibitors are preferably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, 2,2'-methylenebis(4,6-di-t-butyl-1-phenyloxy)(2-ethylhexyloxy)phosphorus, and the like. One kind or two or more kinds among these oxidation inhibitors are preferably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "H-BHT" available from Sakai Chemical Industry Co., Ltd., "IRGANOX 1010" available from BASF Japan Ltd., and the like.

With regard to the interlayer film and laminated glass, in order to maintain high visible light transmittance thereof over a long period of time, the content of the oxidation inhibitor is preferably 0.03% by weight or more, more preferably 0.1% by weight or more in 100% by weight of the interlayer film or in 100% by weight of the layer containing the oxidation inhibitor (a first layer, a second layer, a third layer, or a colored layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the interlayer film, the first layer, the second layer, the third layer, and the colored layer may contain additives such as a coupling agent, a dispersing agent, a surfactant, a flame retardant, an antistatic agent, an adhesive strength regulator other than metal salt, a moisture-resistance agent, a fluorescent brightening agent, and an infrared ray absorber, as necessary. One kind of these additives may be used alone, and two or more kinds thereof may be used in combination.

(Other Details of Interlayer Film for Laminated Glass)

The distance between one end and the other end of the interlayer film is preferably 0.5 m or more, more preferably 0.8 m or more, and especially preferably 1 m or more, and is preferably 3 m or less, more preferably 2 m or less, and especially preferably 1.5 m or less. When the interlayer film has a lengthwise direction and a widthwise direction, the distance between one end and the other end is the distance in the lengthwise direction of the interlayer film. When the interlayer film has a square planar shape, the distance between one end and the other end is a distance between one end and the other end that are opposed to each other.

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film and the laminated glass is further improved.

The thickness of the interlayer film is designated as T. From the viewpoint of making a void more difficult to be generated in an end part of laminated glass, and further suppressing deterioration in transparency of laminated glass in the case of a multi-layered interlayer film, the thickness of the first layer (preferably the thickness in the non-colored part) is preferably 0.0625T or more, more preferably 0.1T or more, and is preferably 0.375T or less, and more preferably 0.25T or less.

The thickness of each of the second layer and the third layer (preferably the thickness in a non-colored part) is preferably 0.3125T or more, more preferably 0.375 or more, further preferably 0.625T or more, especially preferably 0.75T or more, and is preferably 0.9375T or less, more preferably 0.9T or less. When the thickness of each of the second layer and the third layer (preferably the thickness in a non-colored part) is the above lower limit or more and the above upper limit or less, a void is more difficult to be generated in an end part of the laminated glass, and deterioration in transparency of the laminated glass can be further suppressed. When the thickness of each of the second layer and the third layer is the above-described lower limit or more and the above-described upper limit or less, bleeding out of the plasticizer can be suppressed.

From the viewpoint of making a void more difficult to be generated in an end part of laminated glass, a total thickness of the second layer and the third layer (preferably the thickness in the non-colored part) is preferably 0.625T or more, more preferably 0.75T or more, and is preferably 0.9375T or less, and more preferably 0.9T or less when the interlayer film includes the second layer and the third layer. When the total thickness of the second layer and the third layer is the above-described lower limit or more and the above-described upper limit or less, bleeding out of the plasticizer can be suppressed.

The interlayer film may be an interlayer film having a uniform thickness, and may be an interlayer film having varying thickness. The sectional shape of the interlayer film may be a rectangular shape and may be a wedge-like shape.

The interlayer film may be wound to be formed into a roll body of the interlayer film. The roll body may include a winding core and an interlayer film wound on the outer periphery of the winding core.

The method for producing the interlayer film is not particularly limited. In the case of a single-layered interlayer film, examples of the production method of the interlayer film include a method of extruding a resin composition with an extruder. One exemplary method for forming the interlayer film in the case of a multi-layered interlayer film includes separately forming respective layers by using resin compositions for forming respective layers, and then layering the obtained layers. Further, one exemplary method for forming the interlayer film includes co-extruding resin compositions for forming respective layers using extruder to layer the respective layers. A production method of extrusion-molding is preferred because the method is suitable for continuous production.

For the reason of excellent production efficiency of the interlayer film, it is preferred that the second layer and the third layer contain the same polyvinyl acetal resin. For the reason of excellent production efficiency of the interlayer film, it is more preferred that the second layer and the third layer contain the same polyvinyl acetal resin and the same plasticizer. For the reason of excellent production efficiency of the interlayer film, it is further preferred that the second layer and the third layer be formed of the same resin composition.

It is preferred that the interlayer film have protrusions and recesses on at least one surface of the surfaces of both sides. It is more preferred that the interlayer film have protrusions and recesses on surfaces of both sides. Examples of the method for forming the protrusions and recesses include, but are not particularly limited to, a lip emboss method, an emboss roll method, a calender roll method, and a profile extrusion method, and the like. The emboss roll method is preferred because a large number of embosses of the protrusions and recesses, which is a quantitatively constant protrusion and recess pattern, can be formed.

(Laminated Glass)

The laminated glass according to the present invention includes a first lamination glass member, a second lamination glass member and the aforementioned interlayer film for laminated glass. In the laminated glass according to the present invention, the above-described interlayer film for laminated glass is arranged between the first lamination glass member and the second lamination glass member.

FIG. 3 is a sectional view schematically showing an example of laminated glass prepared with the interlayer film for laminated glass shown in FIG. 1.

A laminated glass 21 shown in FIG. 3 includes a first lamination glass member 31, a second lamination glass member 32 and the interlayer film 1. The interlayer film 1 is arranged between the first lamination glass member 31 and the second lamination glass member 32 to be sandwiched therebetween. The first lamination glass member 31 is layered on a first surface (one surface) of the interlayer film 1. The second lamination glass member 32 is layered on a second surface (other surface) opposite to the first surface of the interlayer film 1. The first lamination glass member 31 is layered on the outer surface of the second layer 12 in the interlayer film 1. The second lamination glass member 32 is layered on the outer surface of the third layer 13 in the interlayer film 1.

FIG. 4 is a sectional view schematically showing an example of laminated glass prepared with the interlayer film for laminated glass shown in FIG. 2.

A laminated glass 21A shown in FIG. 4 includes a first lamination glass member 31A, a second lamination glass member 32A and the interlayer film 1A. The interlayer film 1A is arranged between the first lamination glass member 31A and the second lamination glass member 32A to be sandwiched therebetween. The first lamination glass member 31A is layered on a first surface (one surface) of the interlayer film 1A. The second lamination glass member 32A is layered on a second surface (other surface) opposite to the first surface of the interlayer film 1A.

As described above, the laminated glass according to the present invention includes a first lamination glass member, a second lamination glass member, and an interlayer film, and the interlayer film is the interlayer film for laminated glass according to the present invention. In the laminated glass according to the present invention, the interlayer film is arranged between the first lamination glass member and the second lamination glass member.

It is preferred that the first lamination glass member be the first glass plate. It is preferred that the second lamination glass member be the second glass plate.

Examples of the first and second lamination glass members include a glass plate, and a PET (polyethylene terephthalate) film, and the like. As the laminated glass, laminated glass in which an interlayer film is sandwiched between two glass plates, as well as laminated glass in which an interlayer film is sandwiched between a glass plate and a PET film or the like is included. The laminated glass is a laminate including a glass plate, and it is preferred that at least one glass plate be used. It is preferred that each of the first lamination glass member and the second lamination glass member be a glass plate or a PET film, and the laminated glass include a glass plate as at least one of the first lamination glass member and the second lamination glass member. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

The thicknesses of each of the first lamination glass member and the second lamination glass member is preferably 1 mm or more, and is preferably 5 mm or less, and more preferably 3 mm or less. Moreover, when the lamination glass member is a glass plate, the thickness of the glass plate is preferably 0.5 mm or more, more preferably 0.7 mm or more, and is preferably 5 mm or less, more preferably 3 mm or less. When the lamination glass member is a PET film, the thickness of the PET film is preferably 0.03 mm or more and is preferably 0.5 mm or less.

The method for producing the laminated glass is not particularly limited. First, the interlayer film is sandwiched between the first lamination glass member and the second lamination glass member to obtain a laminate. Then, for example, by passing the obtained laminate through pressure rolls or subjecting the obtained laminate to decompression suction in a rubber bag, the air remaining between the first and the second lamination glass members and the interlayer film is removed. Then, the laminate is preliminarily bonded together at about 70° C. to 110° C. to obtain a preliminarily press-bonded laminate. Next, by putting the preliminarily press-bonded laminate into an autoclave or by pressing the laminate, the laminate is press-bonded at about 120° C. to 150° C. and under a pressure of 1 MPa to 1.5 MPa. In this way, laminated glass can be obtained.

Each of the interlayer film and the laminated glass can be used for automobiles, railway vehicles, aircraft, ships, and buildings and the like. Each of the interlayer film and the laminated glass can also be used for applications other than these applications. It is preferred that the interlayer film and the laminated glass be an interlayer film and laminated glass for vehicles or for buildings respectively, and it is more preferred that the interlayer film and the laminated glass be an interlayer film and laminated glass for vehicles respectively. Each of the interlayer film and the laminated glass can be used for a windshield, side glass, rear glass, roof glass or glass for backlight of an automobile, and the like. The interlayer film and the laminated glass are suitably used for automobiles. The interlayer film is suitably used for obtaining laminated glass of an automobile.

Hereinafter, the present invention will be described in more detail with reference to examples and comparative examples. The present invention is not limited only to these examples.

In polyvinyl acetal resins used, n-butyraldehyde which has 4 carbon atoms is used for the acetalization. With regard to the polyvinyl acetal resin, the acetalization degree (the butyralization degree), the acetylation degree and the content of the hydroxyl group were measured by a method conforming to JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

The following materials were prepared.
(Coloring Agent)
Anthraquinone dye (Color index: S.B.38)
Anthraquinone dye (Color index: S.B.45)
Anthraquinone dye (Color index: S.B.97)
Anthraquinone dye (Color index: S.B.104)
Anthraquinone dye (Color index: D.V.28)
Anthraquinone dye (Color index: S.R.111)
Anthraquinone dye (Color index: S.Y.163)
Perinone dye (Color index: S.R.135)
Perinone dye (Color index: S.R.179)
Phtharocyanine dye (Color index: S.B.70)
Quinoline dye (Color index: S.Y.33)
Quinoline dye (Color index: D.Y.54)
Other dye (Color index: S.R.118)
Other dye (Color index: S.R.160)
Azo dye (Color index: S.Y.16)
Azo dye (Color index: S.Y.21)
Azo dye (Color index: 5.0.62)
Isoindolinone pigment (Color index: P.Y.110)
Azo pigment (Color index: P.Y.93)
Azo pigment (Color index: P.Y.150)

The "other dye" is a dye that is different from the three kinds of dyes: the anthraquinone dye, the perinone dye and the quinoline dye.
(Light Stabilizer)
Tinuvin765 (available from BASF Japan Ltd., hindered amine light stabilizer, N—C (carbon atom) type)
(Thermoplastic Resin)
Polyvinyl acetal resin (polyvinyl butyral resin, average polymerization degree of 1700, content of hydroxyl group of 30% by mole, acetylation degree of 1% by mole, acetalization degree (butyralization degree) of 69% by mole))

(Plasticizer)
Triethylene glycol di-2-ethylhexanoate (3GO)
(Metal Salt M)
Mg mixture (50:50 (weight ratio) mixture of magnesium 2-ethylbutyrate and magnesium acetate)
(Ultraviolet Ray Screening Agent)
Tinuvin 326 (2-(2'-hydroxy-3'-t-butyl-5-methylphenyl)-5-chlorobenzotriazole, "Tinuvin 326" available from BASF Japan Ltd.)
(Oxidation Inhibitor)
BHT (2,6-di-t-butyl-p-cresol)
IRGANOX 1010 (BASF Japan Ltd. "IRGANOX 1010")

Example 1

Preparation of Composition for Forming Interlayer Film:
The following ingredients were mixed, and kneaded sufficiently with a mixing roll to obtain a composition for forming an interlayer film.
Polyvinylbutyral resin: 100 parts by weight
Triethylene glycol di-2-ethylhexanoate (3GO): 40 parts by weight
An amount that is to be 70 ppm in the obtained interlayer film of Metal salt M (Mg mixture)
An amount that is to be 0.2% by weight in the obtained interlayer film of an oxidation inhibitor (BHT)
An amount that is to be 0.2% by weight in the obtained interlayer film of an ultraviolet ray screening agent (Tinuvin326)
An amount that is to be 0.072% by weight in the obtained interlayer film of anthraquinone dye (Color index: S.B.104)
An amount that is to be 0.027% by weight in the obtained interlayer film of perinone dye (Color index: S.R.179)
An amount that is to be 0.007% by weight in the obtained interlayer film of quinoline dye (Color index: S.Y.33)
Preparation of Interlayer Film:
By extruding a composition for forming an interlayer film with an extruder, a single-layered interlayer film (thickness: 800 μm) having only the first layer was prepared. The obtained interlayer film has only a colored part that is colored in plan view.

Examples 2 to 48 and Comparative Examples 1 to 11

A single-layered interlayer film (thickness: 800 μm) was prepared in the same manner as that in Example 1 except that the kinds and the contents of the ingredients were changed to those shown in Tables 1 to 12. Regarding the metal salt M, the metal salt M of the same kind and the same blending amount as those in Example 1 was used. The content of the coloring matter 3 and the coloring matter 4 of "content of the coloring agent in the interlayer film" in Comparative Examples 4, 5, 10, 11 means a total amount of the coloring matter 3 and the coloring matter 4.
(Evaluation)
(1) Weatherability
The obtained interlayer film was cut out into a piece of 6.5 cm long×5 cm wide. Then the interlayer film was sandwiched between two sheets of clear glass (6.5 cm long×5 cm wide×2.5 mm thick), and vacuum-pressed by retention at 90° C. for 30 minutes with a vacuum laminator, to obtain laminated glass.
The following was conducted using "SX-75" available from Suga Test Instruments Co., Ltd.
The laminated glass was set at a distance of 260 mm to 270 mm from the light source with one of the principal faces of the obtained laminated glass being at the light source (xenon lump) side. The laminated glass was fixed to the sample fixture such that one of the end parts of the laminated glass was exposed. The one principal face of the fixed laminated glass was irradiated with xenon light with an irradiance of 60 W/m$^2$ (irradiance measuring wavelength 300 nm to 400 nm) at a black panel temperature of 63° C., a temperature inside the vessel of 50° C. and a humidity of 50% RH for 500 hours. In this way, the laminated glass after light irradiation was obtained.

For the laminated glass before irradiation with light and the laminated glass after irradiation with light, change in color tone before and after irradiation was determined by color difference ΔE in accordance with JIS K8781-4:2013 using a spectrophotometer ("U-4100" available from Hitachi High-Tech Corporation). The measurement was conducted in a center part of the laminated glass. Weatherability was judged from color difference ΔE according to the following criteria.

[Criteria for Judgment in Weatherability]
  oo: ΔE is 3 or less
  o: ΔE is more than 3 and 10 or less
  x: ΔE is more than 10

The details and the results are shown in the following Tables 1 to 12. In Tables, description of metal salt M was omitted.

TABLE 1

| | Thermoplastic resin | Plasticizer | Oxidation inhibitor | | | | Light stabilizer | | Ultraviolet ray-screening agent | |
|---|---|---|---|---|---|---|---|---|---|---|
| | parts by weight | parts by weight | Kind | parts by weight | Kind | parts by weight | Kind | parts by weight | Kind | parts by weight |
| Example 1 | 100 | 40 | BHT | 0.2 | — | — | — | — | Tinuvin 326 | 0.2 |
| Example 2 | 100 | 40 | BHT | 0.2 | — | — | — | — | Tinuvin 326 | 0.2 |
| Example 3 | 100 | 40 | BHT | 0.2 | — | — | — | — | Tinuvin 326 | 0.2 |
| Example 4 | 100 | 40 | BHT | 0.2 | — | — | — | — | Tinuvin 326 | 0.2 |
| Example 5 | 100 | 40 | BHT | 0.2 | — | — | — | — | Tinuvin 326 | 0.2 |
| Example 6 | 100 | 40 | BHT | 0.2 | — | — | — | — | Tinuvin 326 | 0.2 |
| Example 7 | 100 | 40 | BHT | 0.2 | — | — | — | — | Tinuvin 326 | 0.2 |
| Example 8 | 100 | 40 | — | — | IRGANOX1010 | 0.1 | Tinuvin 765 | 0.02 | Tinuvin 326 | 0.2 |
| Example 9 | 100 | 40 | — | — | IRGANOX1010 | 0.1 | Tinuvin 765 | 0.02 | Tinuvin 326 | 0.2 |
| Example 10 | 100 | 40 | — | — | IRGANOX1010 | 0.1 | Tinuvin 765 | 0.02 | Tinuvin 326 | 0.2 |

TABLE 2

| | Kind of coloring agent | | | | Color Index | | | |
|---|---|---|---|---|---|---|---|---|
| | Coloring matter 1 | Coloring matter 2 | Coloring matter 3 | Coloring matter 4 | Coloring matter 1 | Coloring matter 2 | Coloring matter 3 | Coloring matter 4 |
| Example 1 | Anthraquinone dye | Perinone dye | Quinoline dye | — | S.B.104 | S.R.179 | S.Y.33 | — |
| Example 2 | Anthraquinone dye | Perinone dye | Quinoline dye | — | S.B.104 | S.R.179 | D.Y.54 | — |
| Example 3 | Anthraquinone dye | Perinone dye | Quinoline dye | — | S.B.97 | S.R.179 | S.Y.33 | — |
| Example 4 | Anthraquinone dye | Perinone dye | Quinoline dye | — | S.B.97 | S.R.179 | D.Y.54 | — |
| Example 5 | Anthraquinone dye | Perinone dye | Quinoline dye | — | S.B.45 | S.R.179 | S.Y.33 | — |
| Example 6 | Anthraquinone dye | Perinone dye | Quinoline dye | — | S.B.45 | S.R.179 | D.Y.54 | — |
| Example 7 | Anthraquinone dye | Perinone dye | Azo pigment | — | S.B.45 | S.R.179 | P.Y.93 | — |
| Example 8 | Anthraquinone dye | Perinone dye | Quinoline dye | — | S.B.104 | S.R.179 | S.Y.33 | — |
| Example 9 | Anthraquinone dye | Perinone dye | Quinoline dye | — | S.B.104 | S.R.179 | D.Y.54 | — |
| Example 10 | Anthraquinone dye | Perinone dye | Azo pigment | — | S.B.104 | S.R.179 | P.Y.93 | — |

TABLE 2-continued

| | | Content of coloring agent in interlayer film (% by weight) | | | | Weatherability | |
|---|---|---|---|---|---|---|---|
| | Coloring matter 1 | Coloring matter 2 | Coloring matter 3 | Coloring matter 4 | Total | ΔE | Judgement |
| Example 1 | 0.072 | 0.027 | 0.007 | — | 0.107 | 1.6 | ○○ |
| Example 2 | 0.074 | 0.026 | 0.006 | — | 0.106 | 0.1 | ○○ |
| Example 3 | 0.080 | 0.026 | 0.008 | — | 0.114 | 1.6 | ○○ |
| Example 4 | 0.081 | 0.025 | 0.006 | — | 0.112 | 0.2 | ○○ |
| Example 5 | 0.142 | 0.018 | 0.014 | — | 0.174 | 1.1 | ○○ |
| Example 6 | 0.144 | 0.016 | 0.010 | — | 0.171 | 0.1 | ○○ |
| Example 7 | 0.143 | 0.011 | 0.032 | — | 0.186 | 0.3 | ○○ |
| Example 8 | 0.072 | 0.027 | 0.007 | — | 0.106 | 0.3 | ○○ |
| Example 9 | 0.073 | 0.026 | 0.006 | — | 0.104 | 0.3 | ○○ |
| Example 10 | 0.073 | 0.022 | 0.021 | — | 0.116 | 0.3 | ○○ |

TABLE 3

| | Thermoplastic resin | Plasticizer | Oxidation inhibitor | | Light stabilizer | | Ultraviolet ray screening agent | |
|---|---|---|---|---|---|---|---|---|
| | parts by weight | parts by weight | Kind | parts by weight | Kind | parts by weight | Kind | parts by weight |
| Example 11 | 100 | 40 | — | — | IRGANOX1010 | 0.1 | Tinuvin 765 | 0.02 | Tinuvin 326 | 0.2 |
| Example 12 | 100 | 40 | — | — | IRGANOX1010 | 0.1 | Tinuvin 765 | 0.02 | Tinuvin 326 | 0.2 |
| Example 13 | 100 | 40 | — | — | IRGANOX1010 | 0.1 | Tinuvin 765 | 0.02 | Tinuvin 326 | 0.2 |
| Example 14 | 100 | 40 | — | — | IRGANOX1010 | 0.1 | Tinuvin 765 | 0.02 | Tinuvin 326 | 0.2 |
| Example 15 | 100 | 40 | — | — | IRGANOX1010 | 0.1 | Tinuvin 765 | 0.02 | Tinuvin 326 | 0.2 |
| Example 16 | 100 | 40 | — | — | IRGANOX1010 | 0.1 | Tinuvin 765 | 0.02 | Tinuvin 326 | 0.2 |
| Example 17 | 100 | 40 | — | — | IRGANOX1010 | 0.1 | Tinuvin 765 | 0.02 | Tinuvin 326 | 0.2 |
| Example 18 | 100 | 40 | — | — | IRGANOX1010 | 0.1 | Tinuvin 765 | 0.02 | Tinuvin 326 | 0.2 |
| Example 19 | 100 | 40 | — | — | IRGANOX1010 | 0.1 | Tinuvin 765 | 0.02 | Tinuvin 326 | 0.2 |
| Example 20 | 100 | 40 | — | — | IRGANOX1010 | 0.1 | Tinuvin 765 | 0.02 | Tinuvin 326 | 0.2 |

TABLE 4

| | Kind of coloring agent | | | | Color Index | | | |
|---|---|---|---|---|---|---|---|---|
| | Coloring matter 1 | Coloring matter 2 | Coloring matter 3 | Coloring matter 4 | Coloring matter 1 | Coloring matter 2 | Coloring matter 3 | Coloring matter 4 |
| Example 11 | Anthraquinone dye | Perinone dye | Azo pigment | — | S.B.104 | S.R.179 | P.Y.150 | — |
| Example 12 | Anthraquinone dye | Perinone dye | Anthraquinone dye | Azo pigment | S.B.104 | S.R.179 | S.Y.163 | P.Y.93 |
| Example 13 | Anthraquinone dye | Perinone dye | Anthraquinone dye | Azo pigment | S.B.104 | S.R.179 | S.Y.163 | P.Y.150 |
| Example 14 | Anthraquinone dye | Perinone dye | Quinoline dye | — | S.B.97 | S.R.179 | S.Y.33 | — |
| Example 15 | Anthraquinone dye | Perinone dye | Quinoline dye | — | S.B.97 | S.R.179 | D.Y.54 | — |
| Example 16 | Anthraquinone dye | Perinone dye | Azo pigment | — | S.B.97 | S.R.179 | P.Y.93 | — |
| Example 17 | Anthraquinone dye | Perinone dye | Azo pigment | — | S.B.97 | S.R.179 | P.Y.150 | — |
| Example 18 | Anthraquinone dye | Perinone dye | Anthraquinone dye | Azo pigment | S.B.97 | S.R.179 | S.Y.163 | P.Y.93 |

TABLE 4-continued

| | | | | | | | | |
|---|---|---|---|---|---|---|---|---|
| Example 19 | Anthraquinone dye | Perinone dye | Anthraquinone dye | Azo pigment | S.B.97 | S.R.179 | S.Y.163 | P.Y.150 |
| Example 20 | Anthraquinone dye | Perinone dye | Quinoline dye | — | S.B.45 | S.R.179 | S.Y.33 | — |

| | Content of coloring agent in interlayer film (% by weight) | | | | | Weatherability | |
|---|---|---|---|---|---|---|---|
| | Coloring matter 1 | Coloring matter 2 | Coloring matter 3 | Coloring matter 4 | Total | ΔE | Judgement |
| Example 11 | 0.074 | 0.021 | 0.018 | — | 0.113 | 0.3 | ⊚⊚ |
| Example 12 | 0.076 | 0.019 | 0.020 | 0.007 | 0.122 | 2.1 | ⊚⊚ |
| Example 13 | 0.076 | 0.020 | 0.019 | 0.006 | 0.121 | 2.1 | ⊚⊚ |
| Example 14 | 0.078 | 0.026 | 0.008 | — | 0.112 | 0.5 | ⊚⊚ |
| Example 15 | 0.079 | 0.025 | 0.006 | — | 0.111 | 0.2 | ⊚⊚ |
| Example 16 | 0.079 | 0.021 | 0.022 | — | 0.122 | 0.1 | ⊚⊚ |
| Example 17 | 0.080 | 0.021 | 0.019 | — | 0.119 | 0.3 | ⊚⊚ |
| Example 18 | 0.081 | 0.020 | 0.011 | 0.014 | 0.126 | 1.8 | ⊚⊚ |
| Example 19 | 0.083 | 0.018 | 0.021 | 0.007 | 0.128 | 2.6 | ⊚⊚ |
| Example 20 | 0.141 | 0.018 | 0.014 | 0.000 | 0.172 | 0.2 | ⊚⊚ |

TABLE 5

| | Thermoplastic resin | Plasticizer | Oxidation inhibitor | | Light stabilizer | | Ultraviolet ray-screening agent | |
|---|---|---|---|---|---|---|---|---|
| | parts by weight | parts by weight | Kind | parts by weight | Kind | parts by weight | Kind | parts by weight |
| | | | Kind | parts by weight | | | | |
| Example 21 | 100 | 40 | — | — | IRGANOX1010 | 0.1 | Tinuvin 765 | 0.02 | Tinuvin 326 | 0.2 |
| Example 22 | 100 | 40 | — | — | IRGANOX1010 | 0.1 | Tinuvin 765 | 0.02 | Tinuvin 326 | 0.2 |
| Example 23 | 100 | 40 | — | — | IRGANOX1010 | 0.1 | Tinuvin 765 | 0.02 | Tinuvin 326 | 0.2 |
| Example 24 | 100 | 40 | — | — | IRGANOX1010 | 0.1 | Tinuvin 765 | 0.02 | Tinuvin 326 | 0.2 |
| Example 25 | 100 | 40 | — | — | IRGANOX1010 | 0.1 | Tinuvin 765 | 0.02 | Tinuvin 326 | 0.2 |
| Example 26 | 100 | 40 | — | — | IRGANOX1010 | 0.1 | Tinuvin 765 | 0.02 | Tinuvin 326 | 0.2 |
| Example 27 | 100 | 40 | — | — | IRGANOX1010 | 0.1 | Tinuvin 765 | 0.02 | Tinuvin 326 | 0.2 |
| Example 28 | 100 | 40 | — | — | IRGANOX1010 | 0.1 | Tinuvin 765 | 0.02 | Tinuvin 326 | 0.2 |
| Example 29 | 100 | 40 | — | — | IRGANOX1010 | 0.1 | Tinuvin 765 | 0.02 | Tinuvin 326 | 0.2 |
| Example 30 | 100 | 40 | — | — | IRGANOX1010 | 0.1 | Tinuvin 765 | 0.02 | Tinuvin 326 | 0.2 |

TABLE 6

| | Kind of coloring agent | | | | Color Index | | | |
|---|---|---|---|---|---|---|---|---|
| | Coloring matter 1 | Coloring matter 2 | Coloring matter 3 | Coloring matter 4 | Coloring matter 1 | Coloring matter 2 | Coloring matter 3 | Coloring matter 4 |
| Example 21 | Anthraquinone dye | Perinone dye | Quinoline dye | — | S.B.45 | S.R.179 | D.Y.54 | — |
| Example 22 | Anthraquinone dye | Perinone dye | Azo pigment | — | S.B.45 | S.R.179 | P.Y.93 | — |
| Example 23 | Anthraquinone dye | Perinone dye | Quinoline dye | Azo pigment | S.B.45 | S.R.179 | S.Y.33 | P.Y.93 |
| Example 24 | Anthraquinone dye | Perinone dye | Quinoline dye | Azo pigment | S.B.45 | S.R.179 | D.Y.54 | P.Y.93 |
| Example 25 | Anthraquinone dye | Perinone dye | Anthraquinone dye | Azo pigment | S.B.45 | S.R.179 | S.Y.163 | P.Y.150 |

TABLE 6-continued

| | | | | | | | | |
|---|---|---|---|---|---|---|---|---|
| Example 26 | Anthraquinone dye | Perinone dye | Azo pigment | — | S.B.104 | S.R.135 | P.Y.93 | — |
| Example 27 | Anthraquinone dye | Perinone dye | Azo pigment | — | S.B.104 | S.R.135 | P.Y.150 | — |
| Example 28 | Anthraquinone dye | Perinone dye | Anthraquinone dye | Azo pigment | S.B.104 | S.R.135 | S.Y.163 | P.Y.93 |
| Example 29 | Anthraquinone dye | Perinone dye | Anthraquinone dye | Azo pigment | S.B.104 | S.R.135 | S.Y.163 | P.Y.150 |
| Example 30 | Anthraquinone dye | Perinone dye | Azo pigment | — | S.B.97 | S.R.135 | P.Y.93 | — |

| | Content of coloring agent in interlayer film (% by weight) | | | | | Weatherability | |
|---|---|---|---|---|---|---|---|
| | Coloring matter 1 | Coloring matter 2 | Coloring matter 3 | Coloring matter 4 | Total | ΔE | Judgement |
| Example 21 | 0.143 | 0.016 | 0.010 | 0.000 | 0.169 | 0.6 | ○○ |
| Example 22 | 0.141 | 0.010 | 0.032 | — | 0.183 | 1.0 | ○○ |
| Example 23 | 0.141 | 0.017 | 0.012 | 0.004 | 0.173 | 0.3 | ○○ |
| Example 24 | 0.143 | 0.016 | 0.009 | 0.003 | 0.170 | 0.6 | ○○ |
| Example 25 | 0.217 | 0.006 | 0.029 | 0.010 | 0.262 | 2.7 | ○○ |
| Example 26 | 0.072 | 0.026 | 0.025 | — | 0.122 | 2.0 | ○○ |
| Example 27 | 0.073 | 0.025 | 0.021 | — | 0.118 | 2.7 | ○○ |
| Example 28 | 0.074 | 0.023 | 0.023 | 0.008 | 0.128 | 2.6 | ○○ |
| Example 29 | 0.074 | 0.023 | 0.022 | 0.007 | 0.126 | 2.5 | ○○ |
| Example 30 | 0.078 | 0.025 | 0.025 | — | 0.128 | 1.9 | ○○ |

TABLE 7

| | Thermoplastic resin | Plasticizer | Oxidation inhibitor | | | | Light stabilizer | | Ultraviolet ray screening agent | |
|---|---|---|---|---|---|---|---|---|---|---|
| | parts by weight | parts by weight | Kind | parts by weight | Kind | parts by weight | Kind | parts by weight | Kind | parts by weight |
| Example 31 | 100 | 40 | — | — | IRGANOX1010 | 0.1 | Tinuvin 765 | 0.02 | Tinuvin 326 | 0.2 |
| Example 32 | 100 | 40 | — | — | IRGANOX1010 | 0.1 | Tinuvin 765 | 0.02 | Tinuvin 326 | 0.2 |
| Example 33 | 100 | 40 | — | — | IRGANOX1010 | 0.1 | Tinuvin 765 | 0.02 | Tinuvin 326 | 0.2 |
| Example 34 | 100 | 40 | — | — | IRGANOX1010 | 0.1 | Tinuvin 765 | 0.02 | Tinuvin 326 | 0.2 |
| Example 35 | 100 | 40 | — | — | IRGANOX1010 | 0.1 | Tinuvin 765 | 0.02 | Tinuvin 326 | 0.2 |
| Example 36 | 100 | 40 | BHT | 0.2 | — | — | — | — | Tinuvin 326 | 0.2 |
| Example 37 | 100 | 40 | BHT | 0.2 | — | — | — | — | Tinuvin 326 | 0.2 |
| Example 38 | 100 | 40 | BHT | 0.2 | — | — | — | — | Tinuvin 326 | 0.2 |
| Example 39 | 100 | 40 | BHT | 0.2 | — | — | — | — | Tinuvin 326 | 0.2 |
| Example 40 | 100 | 40 | BHT | 0.2 | — | — | — | — | Tinuvin 326 | 0.2 |

TABLE 8

| | Kind of coloring agent | | | | Color Index | | | |
|---|---|---|---|---|---|---|---|---|
| | Coloring matter 1 | Coloring matter 2 | Coloring matter 3 | Coloring matter 4 | Coloring matter 1 | Coloring matter 2 | Coloring matter 3 | Coloring matter 4 |
| Example 31 | Anthraquinone dye | Perinone dye | Azo pigment | — | S.B.97 | S.R.135 | P.Y.150 | — |
| Example 32 | Anthraquinone dye | Perinone dye | Anthraquinone dye | Azo pigment | S.B.97 | S.R.135 | S.Y.163 | P.Y.93 |
| Example 33 | Anthraquinone dye | Perinone dye | Anthraquinone dye | Azo pigment | S.B.97 | S.R.135 | S.Y.163 | P.Y.150 |

TABLE 8-continued

| | | | | | | | | |
|---|---|---|---|---|---|---|---|---|
| Example 34 | Anthraquinone dye | Perinone dye | Quinoline dye | — | S.B.45 | S.R.135 | D.Y.54 | — |
| Example 35 | Anthraquinone dye | Perinone dye | Anthraquinone dye | Azo pigment | S.B.45 | S.R.135 | S.Y.163 | P.Y.150 |
| Example 36 | Anthraquinone dye | Perinone dye | Anthraquinone dye | — | S.B.97 | S.R.179 | S.Y.163 | — |
| Example 37 | Anthraquinone dye | Perinone dye | Anthraquinone dye | — | S.B.45 | S.R.179 | S.Y.163 | — |
| Example 38 | Anthraquinone dye | Perinone dye | Anthraquinone dye | — | S.B.97 | S.R.135 | S.Y.163 | — |
| Example 39 | Anthraquinone dye | Perinone dye | Azo dye | — | S.B.97 | S.R.135 | S.Y.16 | — |
| Example 40 | Anthraquinone dye | Perinone dye | Isoindolinone pigment | — | S.B.97 | S.R.135 | P.Y.110 | — |

| | Content of coloring agent in interlayer film (% by weight) | | | | | Weatherability | |
|---|---|---|---|---|---|---|---|
| | Coloring matter 1 | Coloring matter 2 | Coloring matter 3 | Coloring matter 4 | Total | ΔE | Judgement |
| Example 31 | 0.079 | 0.024 | 0.022 | — | 0.125 | 2.8 | ◯◯ |
| Example 32 | 0.081 | 0.022 | 0.024 | 0.008 | 0.135 | 3.0 | ◯◯ |
| Example 33 | 0.081 | 0.022 | 0.023 | 0.008 | 0.134 | 2.7 | ◯◯ |
| Example 34 | 0.140 | 0.021 | 0.011 | — | 0.172 | 1.8 | ◯◯ |
| Example 35 | 0.216 | 0.008 | 0.030 | 0.010 | 0.264 | 2.8 | ◯◯ |
| Example 36 | 0.083 | 0.018 | 0.032 | — | 0.133 | 3.1 | ◯ |
| Example 37 | 0.154 | 0.004 | 0.046 | — | 0.204 | 3.9 | ◯ |
| Example 38 | 0.082 | 0.021 | 0.036 | — | 0.140 | 3.2 | ◯ |
| Example 39 | 0.078 | 0.030 | 0.060 | — | 0.168 | 3.6 | ◯ |
| Example 40 | 0.080 | 0.014 | 0.043 | — | 0.138 | 3.8 | ◯ |

TABLE 9

| | Thermoplastic resin | Plasticizer | Oxidation inhibitor | | | | Light stabilizer | | Ultraviolet ray screening agent | |
|---|---|---|---|---|---|---|---|---|---|---|
| | parts by weight | parts by weight | Kind | parts by weight | Kind | parts by weight | Kind | parts by weight | Kind | parts by weight |
| Example 41 | 100 | 40 | — | — | IRGANOX1010 | 0.1 | Tinuvin 765 | 0.02 | Tinuvin 326 | 0.2 |
| Example 42 | 100 | 40 | BHT | 0.2 | IRGANOX1010 | 0.1 | Tinuvin 765 | 0.02 | Tinuvin 326 | 0.2 |
| Example 43 | 100 | 40 | BHT | 0.2 | IRGANOX1010 | 0.1 | Tinuvin 765 | 0.02 | Tinuvin 326 | 0.2 |
| Example 44 | 100 | 40 | — | — | [RGANOX1010 | 0.1 | Tinuvin 765 | 0.02 | Tinuvin 326 | 0.2 |
| Example 45 | 100 | 40 | BHT | 0.2 | (RGANOX1010 | 0.1 | Tinuvin 765 | 0.02 | Tinuvin 326 | 0.2 |
| Example 46 | 100 | 40 | — | — | IRGANOX1010 | 0.1 | Tinuvin 765 | 0.02 | Tinuvin 326 | 0.2 |
| Example 47 | 100 | 40 | — | — | IRGANOX1010 | 0.1 | Tinuvin 765 | 0.02 | Tinuvin 326 | 0.2 |
| Example 48 | 100 | 40 | — | — | IRGANOX1010 | 0.1 | Tinuvin 765 | 0.02 | Tinuvin 326 | 0.2 |

TABLE 10

| | Kind of coloring agent | | | | Color Index | | | |
|---|---|---|---|---|---|---|---|---|
| | Coloring matter 1 | Coloring matter 2 | Coloring matter 3 | Coloring matter 4 | Coloring matter 1 | Coloring matter 2 | Coloring matter 3 | Coloring matter 4 |
| Example 41 | Anthraquinone dye | Perinone dye | Anthraquinone dye | — | S.B.104 | S.R.135 | S.Y.163 | — |
| Example 42 | Anthraquinone dye | Perinone dye | Anthraquinone dye | — | S.B.97 | S.R.135 | S.Y.163 | — |
| Example 43 | Anthraquinone dye | Perinone dye | Isoindolinone pigment | — | S.B.97 | S.R.135 | P.Y.110 | — |

TABLE 10-continued

| | | | | | | | | |
|---|---|---|---|---|---|---|---|---|
| Example 44 | Anthraquinone dye | Perinone dye | Anthraquinone dye | — | S.B.45 | S.R.135 | S.Y.163 | — |
| Example 45 | Anthraquinone dye | Perinone dye | Anthraquinone dye | — | S.B.38 | S.R.135 | S.Y.163 | — |
| Example 46 | Anthraquinone dye | Perinone dye | Anthraquinone dye | — | S.B.104 | S.R.179 | S.Y.163 | — |
| Example 47 | Anthraquinone dye | Perinone dye | Anthraquinone dye | — | S.B.97 | S.R.179 | S.Y.163 | — |
| Example 48 | Anthraquinone dye | Perinone dye | Anthraquinone dye | — | S.B.45 | S.R.179 | S.Y.163 | — |

| | Content of coloring agent in interlayer film (% by weight) | | | | | Weatherability | |
|---|---|---|---|---|---|---|---|
| | Coloring matter 1 | Coloring matter 2 | Coloring matter 3 | Coloring matter 4 | Total | ΔE | Judgement |
| Example 41 | 0.076 | 0.021 | 0.034 | — | 0.132 | 4.7 | ○ |
| Example 42 | 0.082 | 0.021 | 0.036 | — | 0.140 | 5.7 | ○ |
| Example 43 | 0.080 | 0.014 | 0.043 | — | 0.138 | 3.5 | ○ |
| Example 44 | 0.220 | 0.006 | 0.047 | — | 0.273 | 6.6 | ○ |
| Example 45 | 0.063 | 0.031 | 0.030 | — | 0.124 | 3.9 | ○ |
| Example 46 | 0.076 | 0.019 | 0.030 | — | 0.125 | 4.7 | ○ |
| Example 47 | 0.083 | 0.018 | 0.032 | — | 0.133 | 4.7 | ○ |
| Example 48 | 0.220 | 0.005 | 0.046 | — | 0.271 | 4.0 | ○ |

TABLE 11

| | Thermoplastic resin | Plasticizer | Oxidation inhibitor | | | | Light stabilizer | | Ultraviolet ray screening agent | |
|---|---|---|---|---|---|---|---|---|---|---|
| | parts by weight | parts by weight | Kind | parts by weight | Kind | parts by weight | Kind | parts by weight | Kind | parts by weight |
| Comparative Example 1 | 100 | 40 | BHT | 0.2 | — | — | — | — | Tinuvin 326 | 0.2 |
| Comparative Example 2 | 100 | 40 | BHT | 0.2 | — | — | — | — | Tinuvin 326 | 0.2 |
| Comparative Example 3 | 100 | 40 | BHT | 0.2 | — | — | — | — | Tinuvin 326 | 0.2 |
| Comparative Example 4 | 100 | 40 | BHT | 0.2 | — | — | — | — | Tinuvin 326 | 0.2 |
| Comparative Example 5 | 100 | 40 | BHT | 0.2 | — | — | — | — | Tinuvin 326 | 0.2 |
| Comparative Example 6 | 100 | 40 | — | — | IRGANOX1010 | 0.1 | Tinuvin 765 | 0.02 | Tinuvin 326 | 0.2 |
| Comparative Example 7 | 100 | 40 | BHT | 0.2 | IRGANOX1010 | 0.1 | Tinuvin 765 | 0.02 | Tinuvin 326 | 0.2 |
| Comparative Example 8 | 100 | 40 | BHT | 0.2 | IRGANOX1010 | 0.1 | Tinuvin 765 | 0.02 | Tinuvin 326 | 0.2 |
| Comparative Example 9 | 100 | 40 | BHT | 0.2 | IRGANOX1010 | 0.1 | Tinuvin 765 | 0.02 | Tinuvin 326 | 0.2 |
| Comparative Example 10 | 100 | 40 | BHT | 0.2 | IRGANOX1010 | 0.1 | Tinuvin 765 | 0.02 | Tinuvin 326 | 0.2 |
| Comparative Example 11 | 100 | 40 | BHT | 0.2 | IRGANOX1010 | 0.1 | Tinuvin 765 | 0.02 | Tinuvin 326 | 0.2 |

TABLE 12

| | Kind of coloring agent | | | | Color Index | | | |
|---|---|---|---|---|---|---|---|---|
| | Coloring matter 1 | Coloring matter 2 | Coloring matter 3 | Coloring matter 4 | Coloring matter 1 | Coloring matter 2 | Coloring matter 3 | Coloring matter 4 |
| Comparative Example 1 | Anthraquinone dye | Other dye | Anthraquinone dye | — | S.B.97 | S.R.160 | S.Y.163 | — |
| Comparative Example 2 | Phtharocyanine dye | Anthraquinone dye | Anthraquinone dye | — | S.B.70 | D.V.28 | S.Y.163 | — |

TABLE 12-continued

| | | | | | | | | |
|---|---|---|---|---|---|---|---|---|
| Comparative Example 3 | Phtharocyanine dye | Other dye | Anthraquinone dye | — | S.B.70 | S.R.118 | S.Y.163 | — |
| Comparative Example 4 | Phtharocyanine dye | Perinone dye | Azo dye | Azo dye | S.B.70 | S.R.135 | S.Y.21 | S.O.62 |
| Comparative Example 5 | Phtharocyanine dye | Other dye | Azo dye | Azo dye | S.B.70 | S.R.118 | S.Y.21 | S.O.62 |
| Comparative Example 6 | Anthraquinone dye | Anthraquinone dye | Azo pigment | — | S.B.45 | S.R.111 | P.Y.93 | — |
| Comparative Example 7 | Anthraquinone dye | Other dye | Anthraquinone dye | — | S.B.97 | S.R.160 | S.Y.163 | — |
| Comparative Example 8 | Phtharocyanine dye | Anthraquinone dye | Anthraquinone dye | — | S.B.70 | D.V.28 | S.Y.163 | — |
| Comparative Example 9 | Phtharocyanine dye | Other dye | Anthraquinone dye | — | S.B.70 | S.R.118 | S.Y.163 | — |
| Comparative Example 10 | Phtharocyanine dye | Perinone dye | Azo dye | Azo dye | S.B.70 | S.R.135 | S.Y.21 | S.O.62 |
| Comparative Example 11 | Phtharocyanine dye | Other dye | Azo dye | Azo dye | S.B.70 | S.R.118 | S.Y.21 | S.O.62 |

| | Content of coloring agent in interlayer film (% by weight) | | | | | Weatherability | |
|---|---|---|---|---|---|---|---|
| | Coloring matter 1 | Coloring matter 2 | Coloring matter 3 | Coloring matter 4 | Total | ΔE | Judgement |
| Comparative Example 1 | 0.076 | 0.020 | 0.021 | — | 0.117 | 16.28 | X |
| Comparative Example 2 | 0.041 | 0.049 | 0.049 | — | 0.139 | 11.47 | X |
| Comparative Example 3 | 0.085 | 0.044 | 0.027 | — | 0.156 | 14.60 | X |
| Comparative Example 4 | 0.161 | 0.051 | 0.007 | | 0.220 | 16.12 | X |
| Comparative Example 5 | 0.102 | 0.030 | 0.022 | | 0.155 | 11.26 | X |
| Comparative Example 6 | 0.204 | 0.008 | 0.037 | — | 0.249 | 10.50 | X |
| Comparative Example 7 | 0.076 | 0.020 | 0.021 | — | 0.117 | 18.05 | X |
| Comparative Example 8 | 0.041 | 0.049 | 0.049 | — | 0.139 | 13.54 | X |
| Comparative Example 9 | 0.085 | 0.044 | 0.027 | — | 0.156 | 19.23 | X |
| Comparative Example 10 | 0.161 | 0.051 | 0.007 | | 0.220 | 16.97 | X |
| Comparative Example 11 | 0.102 | 0.030 | 0.022 | | 0.155 | 12.02 | X |

In Tables, the employed thermoplastic resin is a polyvinyl acetal resin, and the employed plasticizer is triethylene glycol di-2-ethylhexsanoate.

An interlayer film corresponding to FIG. 1 and a laminated glass corresponding to FIG. 3 were prepared by using a composition in which the content of the coloring agent was changed as follows, as a material of the colored layer in the composition used in Example 22. The content of the coloring agent in 100% by weight of the colored part was the same as the content of the coloring agent in the interlayer film shown in Example 22.

An amount that is to be 1.074% by weight in the colored layer of anthraquinone dye (Color index: S.B.45)

An amount that is to be 0.080% by weight in the colored layer of perinone dye (Color index: S.R.179)

An amount that is to be 0.240% by weight in the colored layer of quinoline dye (Color index: P.Y.93)

It was confirmed that the obtained laminated glass was excellent in weatherability and in suppression of foaming in an end part of the laminated glass.

EXPLANATION OF SYMBOLS 1, 1A: Interlayer film
11, 11A: First layer
12: Second layer
13: Third layer
14, 14A: Colored layer
21, 21A: Laminated glass
31, 31A: First lamination glass member
32, 32A: Second lamination glass member
X: Colored part
Y: Non-colored part

The invention claimed is:

1. An interlayer film for laminated glass, containing an anthraquinone dye and a perinone dye,
   a weight ratio of a content of the anthraquinone dye to a content of the perinone dye being 2 or more and 15 or less,
   the anthraquinone dye containing an anthraquinone dye that is a blue coloring matter,
   the perinone dye containing a perinone dye that is a red coloring matter, and
   the interlayer film further containing a yellow coloring matter that is an azo pigment or a quinoline dye.

2. The interlayer film for laminated glass according to claim 1, containing a light stabilizer.

3. The interlayer film for laminated glass according to claim 2, wherein the light stabilizer is a light stabilizer in which a carbon atom is bonded to a nitrogen atom of a piperidine structure.

4. The interlayer film for laminated glass according to claim 1, containing a thermoplastic resin.

5. The interlayer film for laminated glass according to claim 1, containing a plasticizer.

6. A laminated glass comprising:
a first lamination glass member;
a second lamination glass member; and
the interlayer film for laminated glass according to claim 1,
the interlayer film for laminated glass being arranged between the first lamination glass member and the second lamination glass member.

7. The interlayer film for laminated glass according to claim 1, wherein the anthraquinone dye contains an anthraquinone dye of Color Index: Solvent Blue 45.

8. The interlayer film for laminated glass according to claim 1, containing a polyvinyl acetal resin.

* * * * *